US007707995B2

(12) United States Patent
Kotou et al.

(10) Patent No.: US 7,707,995 B2
(45) Date of Patent: May 4, 2010

(54) MULTI-CYLINDER ENGINE FUEL CONTROL METHOD, ENGINE FUEL INJECTION AMOUNT CONTROL METHOD AND ENGINE OPERATION STATE DISCRIMINATION METHOD USING THE SAME, PROPULSION APPARATUS FOR MULTIPLE ENGINES, AND FUEL INJECTION CONTROL METHOD DURING CRASH ASTERN IN MARINE ENGINE WITH REDUCTION AND REVERSAL DEVICE

(75) Inventors: Fumiya Kotou, Osaka (JP); Tomohiro Otani, Osaka (JP); Hitoshi Adachi, Osaka (JP); Hideo Shiomi, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 12/382,299

(22) Filed: Mar. 12, 2009

(65) Prior Publication Data

US 2009/0253316 A1 Oct. 8, 2009

Related U.S. Application Data

(62) Division of application No. 11/631,475, filed as application No. PCT/JP2005/011619 on Jun. 24, 2005, now Pat. No. 7,661,411.

(30) Foreign Application Priority Data

| | | | |
|---|---|---|---|
| Jul. 12, 2004 | (JP) | ............................. | 2004-204353 |
| Jul. 12, 2004 | (JP) | ............................. | 2004-204357 |
| Jul. 12, 2004 | (JP) | ............................. | 2004-204358 |
| Jul. 12, 2004 | (JP) | ............................. | 2004-204359 |

(51) Int. Cl.
*F02M 51/00* (2006.01)
*B60W 10/04* (2006.01)

(52) U.S. Cl. ....................... 123/488; 701/103; 701/104; 701/110; 701/115

(58) Field of Classification Search ................ 123/463, 123/478, 486, 488, 493, 494, 559.1, 564; 701/21, 103, 104, 110, 114, 115; 440/84, 440/86, 87

See application file for complete search history.

(56) References Cited

U.S. PATENT DOCUMENTS 4,620,420 A * 11/1986 Gloss et al. ................... 60/602

(Continued)

FOREIGN PATENT DOCUMENTS

JP 04-059458 2/1992

(Continued)

*Primary Examiner*—Thomas N Moulis
(74) *Attorney, Agent, or Firm*—Edwards Angell Palmer & Dodge LLP

(57) ABSTRACT

Rotation recognition means for recognizing a revolution of a crankshaft based on the cylinders before the combustion cycle of a cylinder in question is provided. When the supply of fuel by injection from an injector to a certain cylinder of the six cylinders has become impossible, then control is performed to change the number of cylinders targeted by the rotation recognition means so as to recognize the revolution of the crankshaft for all six cylinders whose combustion cycles are consecutive prior to the combustion cycle of the cylinder in question, and to stop the supply of fuel from the injectors for supplying fuel to cylinders whose combustion cycles are equally spaced from the cylinder to which the supply of fuel is not possible, so that the spacing between the combustion cycles in the cylinders whose combustion cycles come before and after and sandwich the cylinder to which the supply of fuel is not possible becomes uniform.

12 Claims, 16 Drawing Sheets

U.S. PATENT DOCUMENTS

| | | | | |
|---|---|---|---|---|
| 5,109,826 | A * | 5/1992 | Kato | 123/564 |
| 5,590,633 | A * | 1/1997 | Tomisawa et al. | 123/491 |
| 5,778,329 | A * | 7/1998 | Officer et al. | 701/55 |
| 5,836,288 | A * | 11/1998 | Nakagawa | 123/491 |
| 6,679,740 | B1 * | 1/2004 | Imanaka et al. | 440/75 |
| 6,959,686 | B2 * | 11/2005 | Lee | 123/305 |
| 6,981,369 | B2 * | 1/2006 | Miura | 60/285 |
| 7,082,932 | B1 * | 8/2006 | Crane | 123/559.1 |
| 2009/0247029 | A1 * | 10/2009 | Maeda et al. | 440/87 |

FOREIGN PATENT DOCUMENTS

| | | |
|---|---|---|
| JP | 9-032582 | 2/1997 |
| JP | 2000-179409 | 6/2000 |
| JP | 2001-071995 | 3/2001 |
| JP | 2001-128388 | 5/2001 |
| JP | 2001-227382 | 8/2001 |
| JP | 2002-276416 | 9/2002 |
| JP | 2004-137920 | 5/2004 |

* cited by examiner

MULTI-CYLINDER ENGINE FUEL CONTROL METHOD, ENGINE FUEL INJECTION AMOUNT CONTROL METHOD AND ENGINE OPERATION STATE DISCRIMINATION METHOD USING THE SAME, PROPULSION APPARATUS FOR MULTIPLE ENGINES, AND FUEL INJECTION CONTROL METHOD DURING CRASH ASTERN IN MARINE ENGINE WITH REDUCTION AND REVERSAL DEVICE

TECHNICAL FIELD

The invention conceptually pertains to the control of engines, and relates to fuel control methods for multi-cylinder engines in which the amount of fuel that is supplied from fuel injection valves to a plurality of cylinders is controlled individually, fuel injection amount control methods, and engine operation state discrimination methods using the same, of an engine (particularly an engine with a supercharger) that controls an injection amount of fuel to be injected from the fuel injection valves, propulsion apparatuses for multiple engines in which propeller shafts are each individually connected to a plurality of engines, and crash astern fuel injection control methods for marine engines with a reduction and reversal device for abruptly stopping the ship when it is moving forward.

BACKGROUND ART

Multi-cylinder engines such as diesel engines generally are furnished with an electric fuel injection apparatus that electrically controls fuel injection (that is, performs fuel injection amount control and injection timing control) according to the operation state of the engine in order to further improve its operability (for example, see Patent Document 1).

In such electric fuel injection apparatuses, the amount of fuel that is supplied from the fuel injection valves to the cylinders of the engine is individually controlled.

Such electric fuel injection apparatuses are conventionally known to include boost compensators that limit the fuel injection amount from the fuel injection valve in accordance with the amount of air that is sucked into the engine, so as to reduce the black smoke that is discharged from the engine (for example, see Patent Document 2).

The electric fuel injection apparatuses described above are used in engines furnished in marine vessels, for example. Conventionally, when a plurality of engines are installed in a marine vessel, for example, it is known that propeller shafts each having a screw propeller at one end are individually connected to the engines and a single regulator lever is used to synchronously adjust the revolution of the propeller shafts of the engines (for example, see Patent Document 3).

Further, in marine vessels, in general, an operation called a crash astern in which the clutch is switched from forward to reverse is performed to abruptly stop the marine vessel. When executing a crash astern, there is a risk that a load that is too large in magnitude will be applied to the engine and cause it to stall. This is because the actual revolution of the engine drops when the clutch is switched from forward to reverse. Thus, to prevent stalling, an engine revolution that functions as an engine stall limit is set for each magnitude of the actual revolution of the engine during execution of the crash astern, and when the speed falls below that engine revolution, the clutch is put into neutral to lower the burden on the engine and allow the actual revolution of the engine to recover, and once this has recovered to a certain degree, then the clutch is switched to reverse.

However, this method requires that the clutch is switched to reverse after the actual revolution of the engine has increased by a certain degree, and thus a considerable amount of time is necessary before the ship comes to a stop.

For this reason, conventionally, when a clutch astern is executed by switching the clutch from forward to reverse in order to stop the ship when it is traveling in the forward direction, control is performed so that the clutch hydraulic pressure is such that the engine does not stop due to the magnitude of the actual revolution of the engine, and this allows the moving ship to stop abruptly without stalling (for example, see Patent Document 4).

Patent Document 1: JP H4-59458B
Patent Document 2: JP 2001-227382A
Patent Document 3: JP 2001-128388A
Patent Document 4: JP 2001-71995A

DISCLOSURE OF THE INVENTION

Problem to be Solved by the Invention

However, in multi-cylinder engines furnished with a conventional electric fuel injection apparatus such as that illustrated in Patent Document 1, when, as shown in FIG. 21, it is not possible to supply fuel from the fuel injection valve to one of the six cylinders (in FIG. 21, the fourth cylinder), then, to ensure engine output, control is performed to increase the amount of fuel that is supplied from the fuel injection valve of the second cylinder, whose combustion cycle follows that of the fourth cylinder.

Control is however then performed to reduce the amount of fuel that is supplied from the fuel injection valve of the sixth cylinder, whose combustion cycle follows that of the second cylinder, by the amount that the supply of fuel from the fuel injection valve of the second cylinder has been increased, and thus the amount of fuel that is supplied from the fuel injection valve of the third cylinder, whose combustion cycle follows that of the sixth cylinder, is increased according to the amount that the supply of fuel from the fuel injection valve of the sixth cylinder has been reduced, and moreover the amount of fuel that is supplied from the fuel injection valve of the fifth cylinder, whose combustion cycle follows that of the third cylinder, is reduced according to the amount that the supply of fuel from the fuel injection valve of the third cylinder has been increased. This is because the amount that the crankshaft is rotated due to the supply of fuel from the fuel injection valve to each cylinder is determined after first recognizing that of the second cylinder, for example, which is before the combustion cycle of the cylinder in question.

The amount of fuel that is supplied from the fuel injection valves of the cylinders thus alternately increases and decreases and therefore is not uniform, and this results in vibration in the engine becoming quite large. Further, in a conventional boost compensator such as that illustrated in Patent Document 2 above, the amount of intake air to the engine is detected by an intake air amount sensor or an intake pressure sensor (boost pressure sensor), and when the engine is in a transient state, such as when in a state of acceleration, the amount of fuel injected from the fuel injection valve is restricted based on the detection value detected by the sensor so as to inhibit the emission of black smoke while obtaining a good acceleration state.

In this case, when the sensor is broken, it is not possible to suitably restrict the amount of fuel that is injected from the fuel injection valve, and thus when the engine is in a transient state, the fuel injection amount necessarily increases and this results in the discharge of a large amount of black smoke from the engine.

Further, providing a sensor necessarily increases costs and thus is disadvantageous in terms of market strategy.

In this regard, there has been a need to inhibit the discharge of black smoke from the engine while obtaining a good acceleration state without depending on a sensor.

In a conventional example where a plurality of engines are installed in a marine vessel, such as illustrated in Patent Document 3 above, when the output of even one of the plurality of engines drops due to fuel injection problems relating to the fuel injection valve, there is a drop in the revolution of the propeller shaft of the engine whose output has fallen, and this causes a revolution difference with respect to the revolution of the propeller shafts of the other remaining engines. Here, conventionally the revolutions of the propeller shafts of the engines are synchronized by a single regulator lever, and thus it was not possible to synchronize the plurality of engines.

Further, as shown in Patent Document 4, when executing a crash astern in a conventional marine vessel, the clutch hydraulic pressure is controlled so that the engine due not stop due to the size of the actual revolution of the engine, and thus if the ship is moving at high speed and an accordingly large load is placed on the engine, it is necessary to change the pressure rise pattern of the clutch hydraulic pressure based on the ship speed, and the clutch hydraulic pressure cannot be stepped up until the ship speed drops to a speed where the load placed on the engine is small. For this reason, it is necessary to maintain a certain predetermined clutch hydraulic pressure until the ship speed has dropped by a certain amount, so that ultimately it takes time to stop a ship that is moving.

However, in the diesel engines that are adopted as the engines for marine vessels, the pressure of the supercharged air (boost pressure) is detected and control is performed to adjust the fuel injection amount with a boost compensator, and when the clutch is switched from forward to reverse when executing a crash astern, the boost is low at particularly low engine speeds and the amount of fuel that is injected to the engine is kept low by the boost compensator. In this case, as in the conventional example discussed above, when it is not possible to step up the clutch hydraulic pressure until the ship speed has dropped to a level at which the load placed on the engine is small, the fuel injection amount is kept low in conjunction with the drop in the actual revolution of the engine when executing the crash astern and the engine has a high likelihood of stalling, and it becomes necessary to adopt some type of countermeasure.

The present invention was arrived at in light of the foregoing matters, and it is an object thereof to provide a fuel control method for a multi-cylinder engine that allows the vibration in the engine to be actively reduced when the supply of fuel from the fuel injection valve to a certain cylinder of the plurality of cylinders has become impossible.

Another aspect of the invention was arrived at in light of the foregoing matters, and it is an object thereof to provide an engine fuel injection amount control method, and an engine operation state control method that employs the same, with which it is possible inhibit the discharge of black smoke from the engine while achieving a good state of acceleration, without depending on a sensor.

Another aspect of the invention was arrived at in light of the foregoing matters, and it is an object thereof to provide a propulsion apparatus for a plurality of engines with which, even if even one of the plurality of engines experiences a drop in output, it is possible to tune the other remaining engines with a single regulator lever.

A further aspect of the invention was arrived at in light of the foregoing matters, and it is an object thereof to provide a fuel injection control method during crash astern in a marine engine with a reduction and reversal device, with which it is possible to abruptly stop the ship while avoiding engine stalling due to control by the boost compensator or filtering during execution of the crash astern.

Means for Solving Problem

To achieve the foregoing objects, in the invention a fuel control method for a multi-cylinder engine in which an amount of fuel that is supplied from a fuel injection valve to a plurality of cylinders is individually controlled is furnished with rotation recognition means for recognizing a revolution of a crankshaft, which rotates due to the supply of fuel from the fuel injection valve to a cylinder, based on a cylinder prior to a combustion cycle of the cylinder in question. Then, when the supply of fuel from the fuel injection valve to a certain cylinder of the plurality of cylinders has become impossible, control is performed to change the number of target cylinders for the rotation recognition means so that it recognizes the revolution of the crankshaft of each of at least four cylinders whose combustion cycles are consecutive prior to the combustion cycle of the cylinder in question, and to stop the supply of fuel from the fuel injection valves that supply fuel to cylinders whose combustion cycles are equally spaced from the cylinder to which the supply of fuel is not possible so that the spacing of the combustion cycles in cylinders whose combustion cycles come before and after and sandwich the cylinder to which the supply of fuel is not possible becomes uniform.

With these specific features, when the supply of fuel from the fuel injection valve to a certain cylinder of the plurality of cylinders has become impossible, the number of target cylinders for the rotation recognition means is changed to at least four cylinders whose combustion cycles are consecutive prior to the combustion cycle of the cylinder in question so that it recognizes the revolution and the revolution of the crankshaft of each of these cylinders, and the supply of fuel from the fuel injection valves that supply fuel to cylinders whose combustion cycles are equally spaced from the cylinder to which the supply of fuel is not possible is stopped so that the spacing between the combustion cycles in cylinders whose combustion cycles come before and after and sandwich that cylinder to which the supply of fuel is not possible becomes uniform, and thus the revolution of the crankshaft is recognized for the at least four cylinders having consecutive combustion cycles prior to the combustion cycle of the cylinder for which the supply of fuel is not possible and used to determine the amount of fuel to be supplied, and the spacing of the combustion cycles in the cylinders to which fuel is not supplied from the fuel injection valve becomes uniform. Thus, it becomes possible to actively reduce the engine vibration that occurs due to the cylinders to which fuel is not supplied from the fuel injection valve.

Further, in this method, it is also possible for an operable region of the engine to be changed according to the vibration of the engine when the supply of fuel from the fuel injection valve to a certain cylinder of the plurality of cylinders has become impossible. In this case, discrepancies in the interval between the combustion cycles of the cylinder to which fuel is not supplied from the fuel injection valve and the cylinders to which fuel is 5 supplied from the fuel injection valve are kept down, so that engine vibration can be effectively reduced in a region where the engine can operate with ease.

Further, in this method, it is also possible for control to be performed to effect the supply of fuel from the fuel injection valves to all of the remaining cylinders when the supply of fuel from the fuel injection valve to a plurality of cylinders whose combustion cycles are consecutive, of the plurality of cylinders, has become impossible. In this case, it becomes possible to secure the operable region of the engine by supplying fuel to all of the remaining cylinders.

Additionally, in the above method, it is also possible for the amount of fuel that is injected by the fuel injection valve, which supplies fuel to a respective cylinder, to be adjusted according to the boost pressure by the boost compensator, and when the supply of fuel from the fuel injection valve to a certain cylinder of the plurality of cylinders has become impossible, for control to be performed to terminate the fuel injection amount adjustment by the boost compensator. In this case, even if the boost pressure falls due to a cylinder that is not supplied with fuel from the fuel injection valve, then terminating the fuel injection amount adjustment based on the boost pressure by the boost compensator suppresses the fuel injection amount in conjunction with the drop in engine output. Thus, when the supply of fuel from a fuel injection valve to a certain cylinder of the plurality of cylinders has become impossible, the region in which engine operation is possible can be expanded without the output of the engine being restricted due to fuel injection amount adjustment by the boost compensator.

To achieve the foregoing objects, in the invention, in a fuel injection amount control method of an engine for controlling an injection amount of fuel that is injected from a fuel injection valve, a transient state of the engine is determined, and when it has been determined that the engine has transitioned to a transient state, control is performed so as to limit a maximum injection amount of fuel from the fuel injection valve for a fixed period, control is performed to switch a fuel injection amount adjustment map so as to limit a maximum injection amount of fuel from the fuel injection valve, or control is performed to change a filtering constant of the fuel injection amount with respect to a transient time so as to limit a maximum injection amount of fuel from the fuel injection valve.

In this method, when an amount of change in a state quantity that is a fixed value during the normal operation state, that is, an amount of change in the setting value for the throttle opening or the rail pressure/injection amount, has exceeded a certain threshold value, then it can be determined that the operation state of the engine is a transient state.

With these specific features, when it has been determined that the engine has transitioned to a transient state, control is performed to limit a maximum injection amount of fuel from the fuel injection valve for a fixed period, control is performed to switch a fuel injection amount adjustment map so as to limit the maximum injection amount of fuel from the fuel injection valve, or control is performed to change a filtering constant of the fuel injection amount with respect to the transient time so as to limit a maximum injection amount of fuel from the fuel injection valve, and thus even if the sensor is broken or a sensor has not been installed, the maximum injection amount of the fuel from the fuel injection valve when the engine has transitioned to a state of acceleration (transient state) is appropriately restricted, effectively inhibiting the discharge of black smoke from the engine without unnecessarily increasing the maximum injection amount of fuel when the engine is in a state of acceleration. Moreover, it becomes unnecessary to limit the maximum injection amount of fuel from the fuel injection valve based on a sensor, and a sensor itself becomes unnecessary, and this eliminates cost increases due to the sensor and is very advantageous in terms of market competition.

Thus, without depending on a sensor for detecting the intake air quantity, it is possible to effectively inhibit the discharge of black smoke from the engine while obtaining a good acceleration state.

To achieve the foregoing objects, in the invention, a propulsion apparatus for a plurality of engines according is furnished with propeller shafts having a screw propeller on its shaft end that are individually connected a plurality of engines, a single regulator lever for synchronously adjusting the revolution of the propeller shafts of the engines, and control means for performing control when an output of even one of the engines has dropped so as to lower the revolution of the propeller shafts of the other remaining engines to tune them to the revolution of the propeller shaft of the engine whose output has dropped.

With these specific features, when the output of even one of the engines has dropped, control is performed to lower the revolution of the propeller shafts of the other remaining engines down to a revolution that is tuned to the revolution of the propeller shaft of the engine whose output has dropped, and thus even if one or more of the engines experiences a drop in output due to fuel injection problems stemming from its fuel injection valve and the revolution of its propeller shaft decreases, it is possible to tune a plurality of engines with a single regulator lever without differences in revolution occurring between the rotation of the propeller shafts of the other remaining normal engines.

Further, in this configuration, it is also possible that when the output of the engine whose output has dropped falls even further and a propelling force no longer can be obtained, the control means terminates control to tune the rotation of the propeller shafts of the other remaining engines to the rotation of the propeller shaft of that engine, so that the only rotation of the propeller shafts of the remaining other engines is adjusted with the regulator lever. In this case, meaningless tuning between normal engines and engines that can no longer obtain a propelling force due to a further drop in their output is avoided, and under these circumstances, in which a significant drop in output is unavoidable, the output of the normal engines that remain is secured so that the performance of a plurality of engines can be maintained.

To achieve the foregoing objects, in the invention, a fuel injection control method during crash astern in a marine engine with reduction and reversal device is such that when it has been determined that a crash astern has been executed by switching a clutch from forward to reverse when a forward moving ship is to be stopped, and an actual revolution of the engine becomes smaller and falls below a target revolution, or the fuel injection amount reaches a limit amount due to fuel injection amount adjustment by the boost compensator based on the boost pressure, then engine stall avoid control that involves at least one of, or a combination of a plurality of, terminating fuel injection amount adjustment according to the boost pressure by a boost compensator, changing a fuel injection amount adjustment map that results in an increase in the fuel injection amount by the boost compensator in accordance with the boost pressure, and changing a filtering process constant with the aim of increasing the control response speed.

With these specific features, when the actual revolution of the engine drops and falls below a target revolution or the fuel injection amount has reached a limit value set by the boost compensator when performing a crash astern, then engine stall avoid control that involves at least one of, or a combination of a plurality of, terminating fuel injection amount adjustment by the boost compensator, changing the fuel injection amount adjustment map toward an increase in the fuel injection amount by the boost compensator, and changing a filtering process constant with the aim of increasing the control response speed, is performed, and thus even if the load placed on the engine by switching the clutch from forward to reverse during the crash astern leads to a drop in its actual revolution, performing engine stall avoid control by terminating fuel injection amount adjustment by the boost compensator in accordance with the boost pressure prevents the fuel injection amount from falling as the actual revolution of the engine falls during the crash astern. Also, even if the load placed on the engine by switching the clutch from forward to reverse during the crash astern leads to a drop in its actual revolution, performing engine stall avoid control by changing a fuel injection amount adjustment map so as to result in an increase in the fuel injection amount in accordance with the boost pressure by the boost compensator leads to an increase in the fuel injection amount without the fuel injection amount being suppressed even if the actual revolution of the engine drops during the crash astern. Further, even if the load placed on the engine by switching the clutch from forward to reverse during execution of the crash astern causes a drop in its actual revolution, performing engine stall avoid control by changing a filtering process constant with the aim of increasing the control response speed reduces the drop in the actual revolution of the engine during the crash astern and limits the degree to which the fuel injection amount is suppressed. Thus, engine stall avoid control involving one or more of these engine stall avoid controls allows stalling due to control by the boost compensator during execution of the crash astern to be avoided and at the same time allows the ship to be abruptly stopped.

In the above method, it is also possible to perform injection pressure increase control for increasing a fuel injection pressure, in addition to engine stall avoid control. Doing this allows the production of black smoke (smoke), which increases along with the increase in the fuel injection amount due to the engine stall avoid control, to be effectively inhibited by the increase in fuel injection pressure.

In the above method, it is also possible to perform injection timing lag control for delaying a fuel injection timing, in addition to the injection pressure increase control. Doing this allows the combustion noise, which increases along with the increase in the fuel injection pressure due to the injection pressure increase control, to be effectively inhibited due to the delay in fuel injection timing.

In the above method, it is also possible that, when it has been determined that execution of the crash astern has been terminated, the control when it is determined that a crash astern is being executed is cancelled in order to return to the normal control in effect prior to execution of the crash astern. In this case, the engine stall avoid control, the injection pressure increase control, and the injection timing lag control during execution of the crash astern are returned to the normal control in effect prior to execution of the crash astern, thereby lowering the smoke (black smoke), which increases due to the increase in the fuel injection amount by the engine stall avoid control, and the combustion noise, which becomes large as the pressure is increased due to the fuel pressure increase control, for example, during the crash astern, to their original levels when it is determined that the crash astern has been terminated.

Effects of the Invention

With the fuel control method for a multi-cylinder engine according to the invention, it is possible to actively reduce engine vibration when the supply of fuel from the fuel injection valve to a certain cylinder of the plurality of cylinders has become impossible.

In other words, when the supply of fuel from the fuel injection valve to a certain cylinder has become impossible, by changing the number of cylinders to be recognized by the rotation recognition means to at least four cylinders whose combustion cycles are consecutive prior to the combustion cycle of the cylinder to which the supply of fuel is impossible so as to recognize the revolution of the crankshaft of each of those cylinders, and stopping the supply of fuel from the fuel injection valves that supply fuel to cylinders whose combustion cycles are equally spaced from that cylinder to which the supply of fuel is not possible to obtain a uniform spacing between the combustion cycles of cylinders whose combustion cycles come before and after and sandwich that cylinder to which the supply of fuel is not possible, the revolution of the crankshaft is recognized for the at least four cylinders having consecutive combustion cycles prior to the combustion cycle of the cylinder to which the supply of fuel is impossible and used to determine an amount of fuel to be supplied, and the interval between the combustion cycles of cylinders to which fuel is not supplied through the fuel injection valve becomes uniform, and this allows engine vibration to be actively reduced.

With the engine fuel injection amount control method, and engine operation state discrimination means using the same, according to the invention, it is possible to limit the maximum fuel injection amount in transient states of the engine without relying on a sensor (such as a boost pressure sensor), allowing the discharge of black smoke from the engine to be inhibited while a good acceleration state is achieved.

In other words, when it has been determined that the engine has transitioned to a transient state, control is performed to limit the maximum injection amount of fuel from the fuel injection valve for a fixed period, control is performed to switch the fuel injection amount adjustment map so as to limit the maximum injection amount of fuel from the fuel injection valve, or control is performed to change the filtering constant of the fuel injection amount with respect to the transient time in order to limit the maximum injection amount of fuel from the fuel injection valve, and by doing this, appropriately limit the maximum injection amount of fuel from the fuel injection valve even if the sensor for detecting the intake air amount is broken or the sensor has not been installed, and thus it is possible to inhibit the discharge of black smoke from the engine while obtaining a good state of acceleration without depending on a sensor for detecting the intake air amount.

With the propulsion apparatus for multiple engines according to the invention, even if the output of one or more of the plurality of engines drops, it is possible to synchronously adjust the other remaining engines using a single regulator lever.

That is to say, when the output of one or more of the plurality of engines has dropped, by performing control to lower the revolution of the propeller shafts of the other engines that remain to a revolution that is tuned to the revolution of the propeller shaft of the engine whose output has dropped, it is possible to simultaneously adjust a plurality of engines using a single regulator lever without causing revolution differences with respect to the revolution of the propeller shafts of the normal engines.

With the crash injection control method during crash astern in a marine engine with reduction and reversal device according to the invention, it is possible to avoid stalling due to control by the boost compensator or the filtering process during execution of a crash astern while quickly bringing the ship to a stop.

Put differently, when during a crash astern the actual revolution of the engine drops and falls below a target revolution or the fuel injection amount reaches a limit value due to the boost compensator, then by performing engine stall avoid control that involves at least one of, or a combination of a plurality of, terminating fuel injection amount adjustment by the boost compensator, changing a fuel injection amount adjustment map toward an increase in the fuel injection amount due the boost compensator, and changing a filtering process constant with the aim of increasing the control response speed, it is possible to avoid engine stalling due to control by the boost compensator during execution of the crash astern by effecting engine stall avoid control that incorporates one or a combination of a plurality of the above engine stall avoid controls and allows the ship to be stopped abruptly, even if the load placed on the engine due to switching the clutch from forward to reverse during the crash astern leads to a drop in the actual revolution.

DESCRIPTION OF REFERENCE NUMERALS

Figure 1:
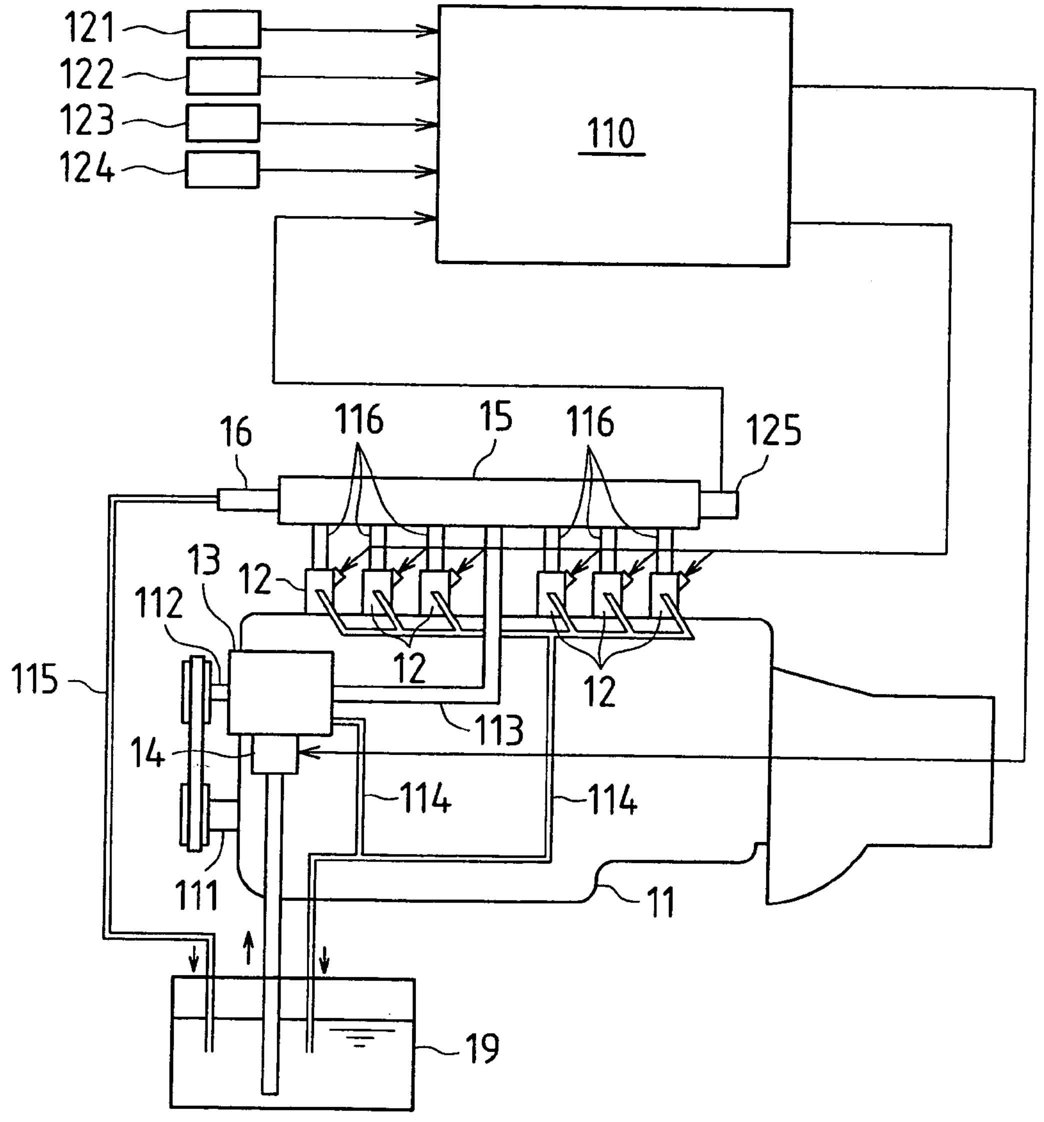
FIG. 1 is a schematic structure diagram showing the overall structure of a common rail-type fuel injection system adopted in a six-cylinder marine engine according to an embodiment of the invention.

11 six-cylinder diesel engine (multi-cylinder engine)
111 crankshaft
1100 rotation recognition means
12 injector (fuel injection valve)
21 injector (fuel injection valve)
221 boost pressure sensor (sensor)
32 left engine (engine)
33 right engine (engine)
34*c*, 35*c* propeller shafts
36 left screw propeller
37 right screw propeller
316 regulator lever
314 controller (control means)
411 forward clutch
412 reverse clutch
413 forward reverse switch valve (clutch)
E diesel engine, engine

BEST MODE FOR CARRYING OUT THE INVENTION

The best modes for implementing the invention are described below with reference to the drawings.

First Embodiment

FIG. 1 shows the overall configuration of a common rail-type fuel injection system used by a multi-cylinder diesel engine according to a first embodiment of the invention.

This common rail-type fuel injection system is furnished with a plurality (for example, 6) injectors 12 that serve as fuel injection valves each provided for a cylinder of a marine six-cylinder diesel engine 11 (hereinafter, referred to as engine), a supply pump 13 that is rotatively driven by the engine 11, a common rail 15 that forms an accumulation chamber that accumulates the high-pressure fuel that is ejected from the supply pump 13, and an electric control unit 110 that electrically controls the injectors 12 of the cylinders and the supply pump 13.

The injector 12 for each cylinder is a fuel injection nozzle that is connected to a high-pressure pump (not shown) linked to the downstream end of one of the plurality of branch pipes (high-pressure pipe route) 116 that branch off the common rail 15, and supplies the high-pressure fuel that has accumulated in the common rail 15 by injecting it into the combustion chamber of that cylinder of the engine 11. The supply of fuel from the injectors 12 to the engine 11 is electrically controlled by conducting and stopping conduction of electricity (ON/OFF) to an injection control solenoid valve (not shown) that is provided at an intermediate location in the fuel channel within the injector 12. That is, when the injection control solenoid valve of the injector 12 of a cylinder is open, then the high-pressure fuel held under pressure in the common rail 15 is supplied by injection into the combustion chamber of that cylinder of the engine 11.

The supply pump 13 has a standard feed pump (not shown) that sucks up the fuel within a fuel tank 19 due to rotation of a pump drive shaft 112 in conjunction with rotation of a crankshaft 111 of the engine 11, a plunger (not shown) that is driven by the pump drive shaft 112, and a pressurizing chamber (not shown) that pressurizes fuel due to the back and forth motion of this plunger. The supply pump 13 is a high-pressure supply pump that pressurizes the fuel that has been sucked out by the feed pump and ejects this high-pressure fuel to the common rail 15 through an ejection opening. An inlet meter valve 14 is attached to the inlet side of the fuel channel to the pressurizing chamber of the supply pump 13, and by opening and closing the fuel channel, changes the amount of fuel that is ejected from the supply pump 13 to the common rail 15.

The inlet meter valve 14 is an intake amount adjustment solenoid valve (pump intake valve) that is electrically controlled by a control signal (pump drive signal) from the electrical control unit 110 via a pump drive circuit that is not shown so as to adjust the intake amount of the fuel that is taken into the pressurizing chamber of the supply pump 13, and is configured so as to change the pressure within the common rail 15 (hereinafter, the common rail pressure), which corresponds to the injection pressure (fuel pressure) of the injection from the injectors 12 to the engine 11. The inlet meter valve 14 is a normally-open type pump flow rate control valve (solenoid valve) that is completely open when the conduction of electricity thereto is stopped.

It is necessary for the common rail 15 to continually maintain a high-pressure that corresponds to the injection pressure, and for this reason is connected to the ejection opening of the supply pump 13, through which high-pressure fuel is ejected via a fuel line (high-pressure line route) 113. It should be noted that leak fuel from the injectors 12 and leak fuel from the supply pump 13 is returned to the fuel tank 19 over a leak line (low-pressure route) 114. A relief line (low-pressure route) 115 that drains fuel from the common rail 15 into the fuel tank 19 is provided with a pressure remitter 16 for allowing pressure to escape so that the common rail pressure does not exceed a maximum accumulator pressure (maximum set pressure).

The pressure remitter 16 is a pressure safety valve that opens when the fuel pressure within the high-pressure line route, that is, the actual common rail pressure, has exceeded the maximum set pressure so as to keep the fuel pressure at or under the maximum set pressure. The pressure remitter 16 is furnished with, for example, a valve body (main valve member), a ball valve (valve member) that opens and closes a valve hole formed in the valve body, a piston that operates in a single unit with the ball valve, and a spring that biases the ball valve and the piston to sit on the valve seat (closed valve direction) with a predetermined biasing force. The open valve pressure of the pressure remitter 16 is determined by the seat diameter of the ball valve and the set weight of the spring.

The electric control unit 110 is furnished with a microcomputer having a common structure that includes the functions of a CPU for performing control and computational processes, a ROM that stores various types of programs and data, a RAM, an input circuit, an output circuit, a power circuit, an injector drive circuit, and a pump drive circuit, for example. Further, the sensor signals from the various sensors are A/D converted by an A/D converter and then input to the microcomputer.

The electric control unit 110 is furnished with injection amount and injection timing determination means for determining the ideal target injection timing (injection start timing) based on the operation conditions of the engine 11 and the target injection amount (injection period) of the fuel to be injected to the engine 11 from the injectors 12 of the cylinders, injection pulse width determination means for calculating the injector injection pulse having an injection pulse period (injection pulse width) that corresponds to the operation conditions of the engine 11 and the target injection amount, and injector drive means for applying the injector injection pulse to the injection control solenoid valve of the injectors 12 via the injector drive circuit. That is, the electric control unit 110 calculates the target injection amount based on engine operation information such as the engine angular velocity (hereinafter, referred to as the engine revolution) that is detected by a revolution sensor 121 and the degree of accelerator opening that is detected by an accelerator opening degree sensor 122, and applies an injector injection pulse to the injection control solenoid valve of the injectors 12 of the cylinders according to the injection pulse width that has been calculated from the operation conditions of the engine 11 and the target injection amount. The engine 11 is operated accordingly.

The electric control unit 110 also functions as ejection amount control means for computing a target common rail pressure that corresponds to the ideal fuel injection pressure for the operation conditions of the engine 11, and drives the inlet meter valve 14 of the supply pump 13 through the pump drive circuit. That is, the electric control unit 110 calculates a target common rail pressure taking into account engine operation information such as the engine revolution that is detected by the revolution sensor 121 and the accelerator opening degree that is detected by the accelerator opening degree sensor 122, as well as corrections to the engine circulating water temperature detected by a circulating water temperature sensor 123, and to achieve this target common rail pressure, outputs a control signal to the inlet meter valve 14 of the supply pump 13.

Figure 2:
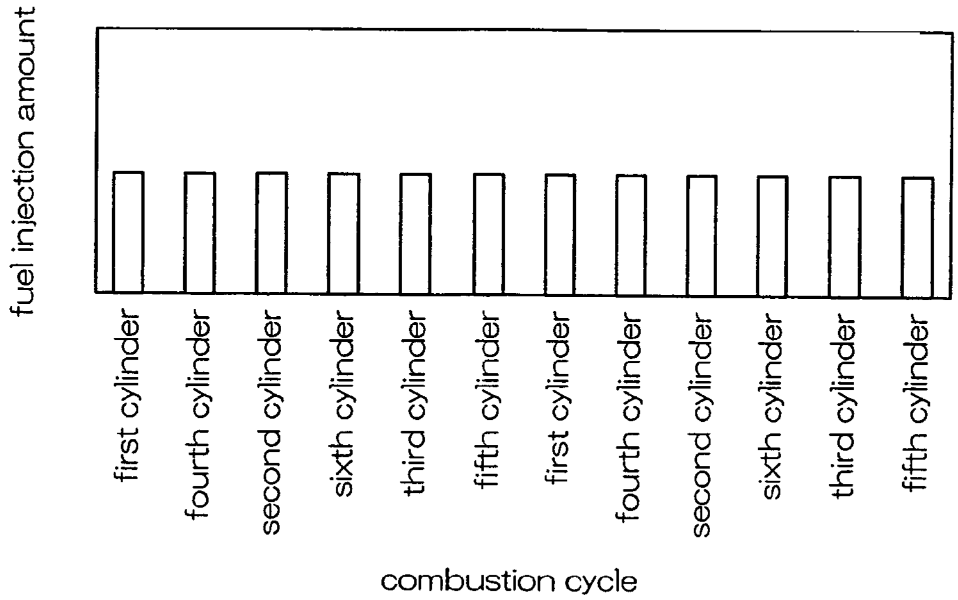
FIG. 2 is a property diagram showing the fuel injection amount of each cylinder in its combustion cycle under normal conditions.
Figure 3:
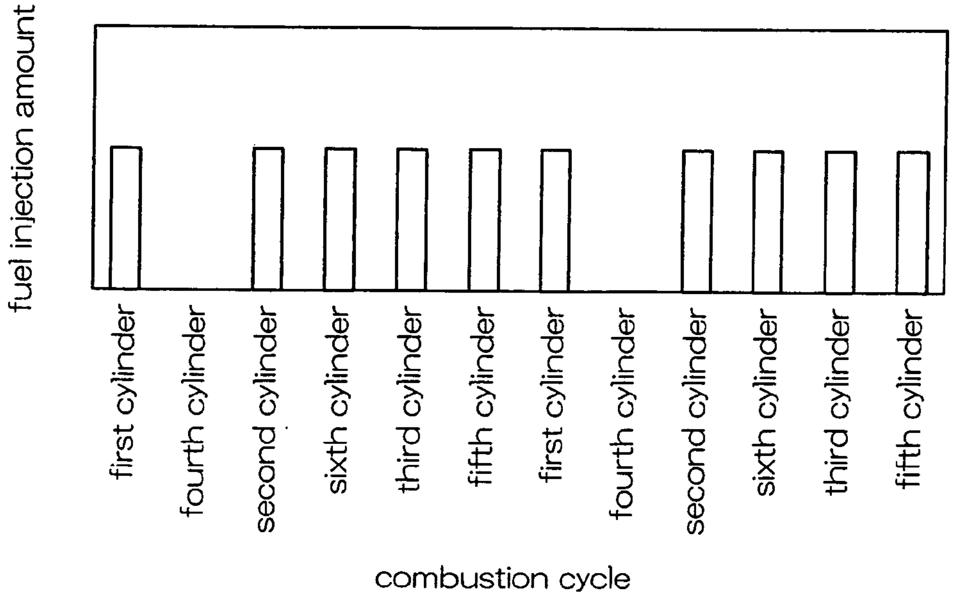
FIG. 3 is a property diagram showing the fuel injection amount of each cylinder in its combustion cycle in a state where the supply of fuel by injection from an injector to a certain cylinder has become impossible.

The rotation of the crankshaft 111 in the combustion cycles of the cylinders, which are repeated in the order of first cylinder, fourth cylinder, second cylinder, sixth cylinder, third cylinder, and fifth cylinder, is input to the electric control unit 110 by a crankshaft rotation sensor 124. As shown in FIG. 2, the electric control unit 110 is also furnished with rotation recognition means 1100 that recognizes the rotation of the crankshaft 111 that is rotated due to the supply of fuel by injection from the injector 12 to the fifth cylinder, for example, based on at least two cylinders (in FIG. 2, the sixth cylinder and the third cylinder) before the combustion cycle of that cylinder (the fifth cylinder to which fuel is supplied by injection from the injector 12). In the case shown in FIG. 3, when it has become impossible to supply fuel by injection from the injector 12 to a certain cylinder (in the drawing, the fourth cylinder) of the six cylinders, the rotation recognition means 1100 changes the number of cylinders to be targeted from the second cylinder to the sixth cylinder so that the rotation of the crankshaft of all six cylinders having a continuous combustion cycle before the combustion cycle of that cylinder (fourth cylinder) is recognized. In this case, the detection that it has become impossible to supply fuel by injection from the injector 12 for a certain cylinder of the six cylinders is performed by a fuel pressure detection sensor 125 provided in the common rail 15, and the fuel pressure detection sensor 125 executes this detection by detecting that there has been a drop in the common rail pressure due to the supply by injection even though the supply of fuel by injection from an injector 12 to a cylinder has occurred.

Figure 4:
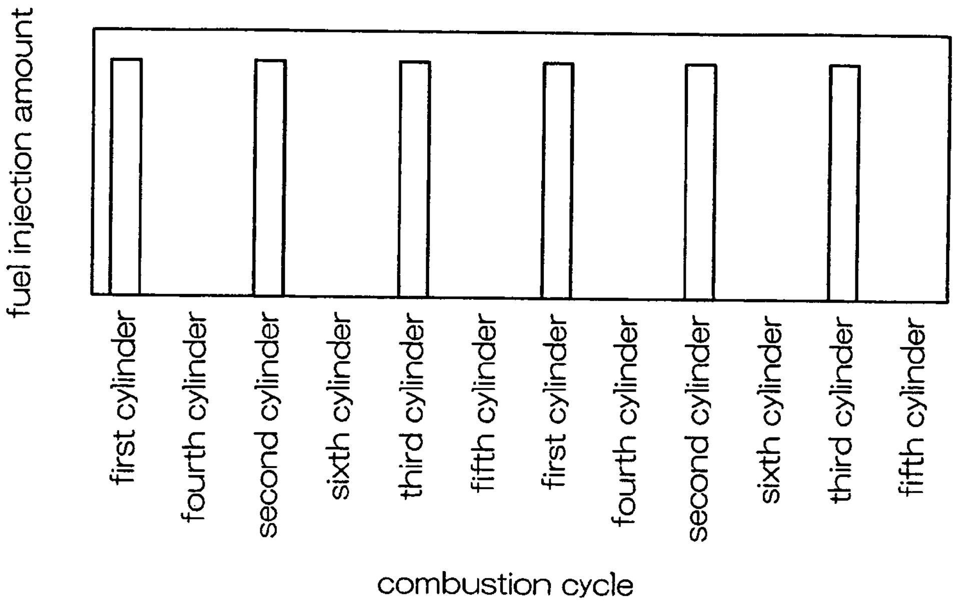
FIG. 4 is a property diagram showing the fuel injection amount of each cylinder in its combustion cycle in a state where the injection of fuel from the injectors for supplying fuel by injection to the sixth cylinder and the fifth cylinder, whose combustion cycles are equally spaced from the combustion cycle of the fourth cylinder to which the supply of fuel by injection is not possible, has been stopped.

When it has become impossible to supply fuel by injection from the injector 12 to a certain cylinder (in FIG. 3, the fourth cylinder) of the six cylinders, as shown in FIG. 4, the electric control unit 110 performs control to stop the injection of fuel from the injectors 12 for supplying fuel by injection to the sixth cylinder and the fifth cylinder, whose combustion cycles are equally spaced from that of the fourth cylinder to which it is no longer possible to supply fuel by injection, so that the combustion cycle interval between the first cylinder and the second cylinder, whose combustion cycles come before and after and sandwich the fourth cylinder to which it is no longer possible to supply fuel by injection, becomes uniform (skipping over one cylinder). At this time, the number of cylinders targeted by the rotation recognition means 1100 is changed to four cylinders so that the revolution of the crankshaft 111 is recognized for the four cylinders whose combustion cycles are continuous at or before the combustion cycle of the cylinder to which it has become impossible to supply fuel by injection from the injector 12 (including the cylinder in which fuel is not supplied by injection). The amount of fuel that is injected from the injectors 12 to the three cylinders is approximately double that when fuel is injected from the injectors 12 to all six cylinders, and thus the engine output is maintained.

Figure 5:
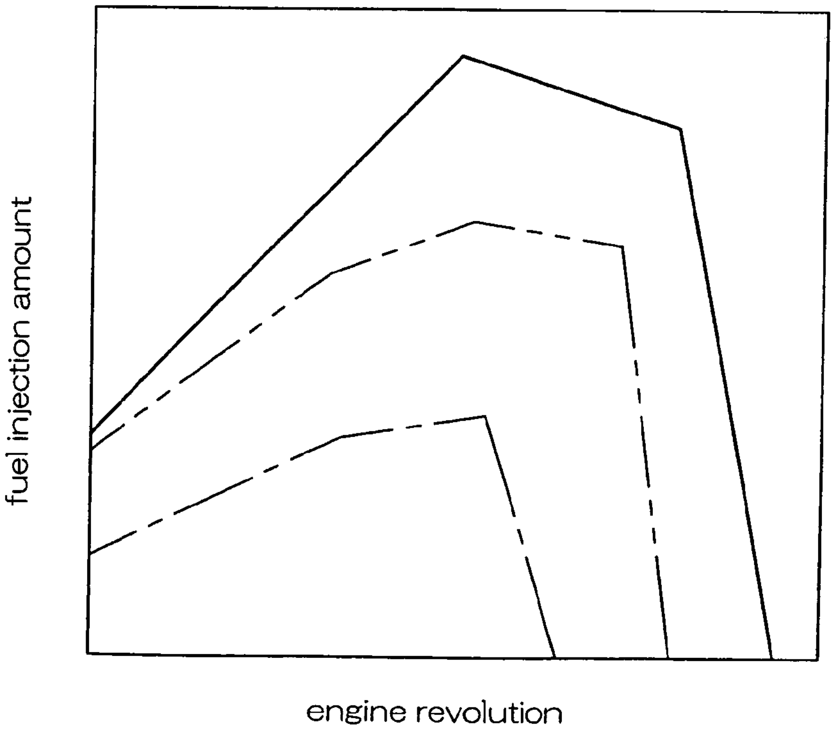
FIG. 5 is a property diagram showing the fuel injection amount characteristics with respect to the revolution of the engine under normal conditions and in a state where the injection of fuel from the injectors to the cylinders has been stopped.
Figure 6:
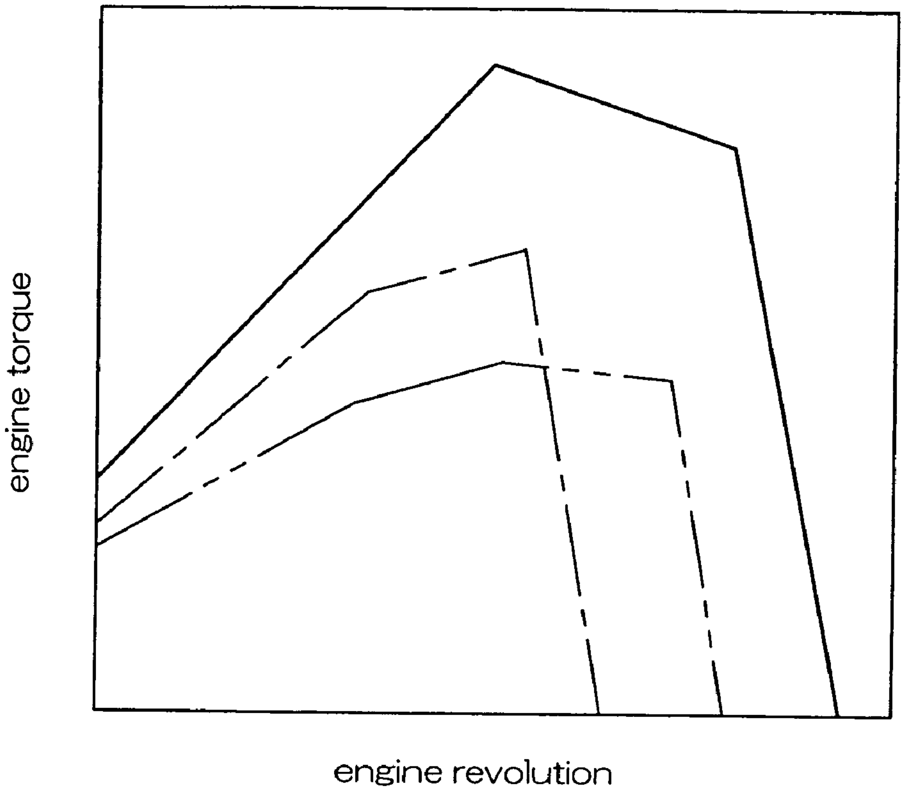
FIG. 6 is a property diagram showing the characteristics of the engine torque with respect to the revolution of the engine under normal conditions and in a state where the injection of fuel from the injectors to the cylinders has been stopped.

When it has become impossible to supply fuel by injection from the injector 12 to one of the six cylinders (in FIG. 3, the fourth cylinder), the electric control unit 110 also changes the operable region of the engine 11 in accordance with the vibration of the engine 11. In this case, as shown in FIG. 5, the operable region is selected according to the two characteristics of the fuel injection amount of the injectors 12 to the cylinders with respect to the revolution, which are determined in advance based on the vibration of the engine 11 (in the drawing, the characteristics indicated by the single-dash line and the double-dash line). It should be noted that the characteristic shown by the solid line in FIG. 5 indicates a normal scenario in which the injection of fuel from the injectors 12 to all of the cylinders occurs without problem. These characteristics also can be inferred from the characteristics of the engine torque with respect to the engine revolution as shown in FIG. 6.

Additionally, when it has become impossible to supply fuel by injection from the injector 12 to two or more of the plurality of cylinders whose combustion cycles are consecutive, the electric control unit 110 performs control so that fuel is injected from the injector 12 to all of the remaining cylinders. For example, when it is no longer possible to supply fuel by injection from the injector 12 to the first cylinder and the fourth cylinder, two cylinders whose combustion cycles are sequential, then the electric control unit 110 performs control so that fuel is supplied by injection from the injector 12 to all of the remaining cylinders, that is, the second cylinder, the sixth cylinder, the third cylinder, and the fifth cylinder.

The amount of fuel that is injected by the injectors 12, which supply fuel by injection to the cylinders, is adjusted by the boost compensator according to the boost pressure. When it has become impossible to supply fuel by injection from the injector 12 to one of the six cylinders, then the electric control unit 110 performs control to cancel the fuel injection amount adjustment by the boost compensator.

Thus, in this embodiment, when it has become impossible to supply fuel by injection from an injector 12 to one of the six cylinders (such as the fourth cylinder), the rotation recognition means 1100 changes the number of cylinders to be recognized to all six cylinders whose combustion cycles are consecutive prior to the combustion cycle of the fourth cylinder, to which it is not possible to supply fuel by injection, and recognizes the rotation of the crankshaft 111 of each cylinder, and then stops the injection of fuel from the injectors 12 that supply fuel by injection to the sixth cylinder and the fifth cylinder, whose combustion cycles are the same interval from the fourth cylinder to which it is not possible to supply fuel by injection, so that the interval between the combustion cycles of the cylinders that come before and after and sandwich the cylinders to which fuel is not supplied by injection becomes uniform, and thus the fuel injection amount is determined by recognizing the rotation of the crankshaft 111 of all six cylinders whose combustion cycles are consecutive before the combustion cycle of the cylinder for which the supply of fuel by injection has become impossible, and the interval between the combustion cycles of the cylinders to which fuel is not supplied by injection from the injectors 12 becomes uniform. Thus, vibration in the engine 11 that is caused by cylinders to which fuel is not supplied by injection from an injector 12 can be actively reduced.

Further, when it has become impossible to supply fuel by injection from the injector 12 to one of the six cylinders, the operable region of the engine 11 is changed in accordance with the two characteristics (in FIG. 5, the characteristics illustrated by the single-dash line and the double-dash line) for the fuel injection amount of the injector 12 to the cylinders with respect to the revolution, which are determined in advance based on the vibration of the engine 11, and thus discrepancies in the interval between the combustion cycles of the cylinders in which fuel is not supplied by injection from the injector 12 and the cylinders in which fuel is supplied by injection from the injector 12 are inhibited, and vibration in the engine 11 can be effectively reduced in a reasonable operable region of the engine 11.

Further, when it has become impossible to supply fuel by injection from the injector 12 to two or more of the six cylinders whose combustion cycles are consecutive, control is performed so that fuel is injected from the injector 12 to all of the remaining cylinders, and thus by supplying fuel by injection to all of the remaining cylinders, it is possible to secure the operable region of the engine 11.

Additionally, when it has become impossible to supply fuel by injection from the injector 12 to one of the six cylinders, control is performed so that the fuel injection amount is no longer adjusted by the boost compensator based on the boost pressure, and thus even if the boost pressure falls due to the cylinder to which fuel is not supplied by injection from the injector 12, by terminating adjustment of the fuel injection amount by the boost compensator based on the boost pressure, the fuel injection amount is kept from dropping along with the drop in engine 11 output. Thus, when it has become impossible to supply fuel by injection from the injector 12 to one of the six cylinders, the operable region of the engine 11 can be increased without limiting the output of the engine 11 due to fuel injection amount adjustment by the boost compensator.

It should be noted that the invention is not limited to the foregoing embodiment, and includes various other modified implementations thereof. For example, in this embodiment a six-cylinder engine was used as the multi-cylinder engine, but as long as the engine has at least four cylinders and there is an even number of cylinders, the invention can be adopted for various types of engines other than for marine vessels.

Second Embodiment

A second embodiment of the invention is described next with reference to the drawings.

This second embodiment is described with regard to a case in which the invention is adopted for a six-cylinder marine diesel engine with supercharger.

—Description of the Structure of the Fuel Injection Apparatus—

Figure 7:
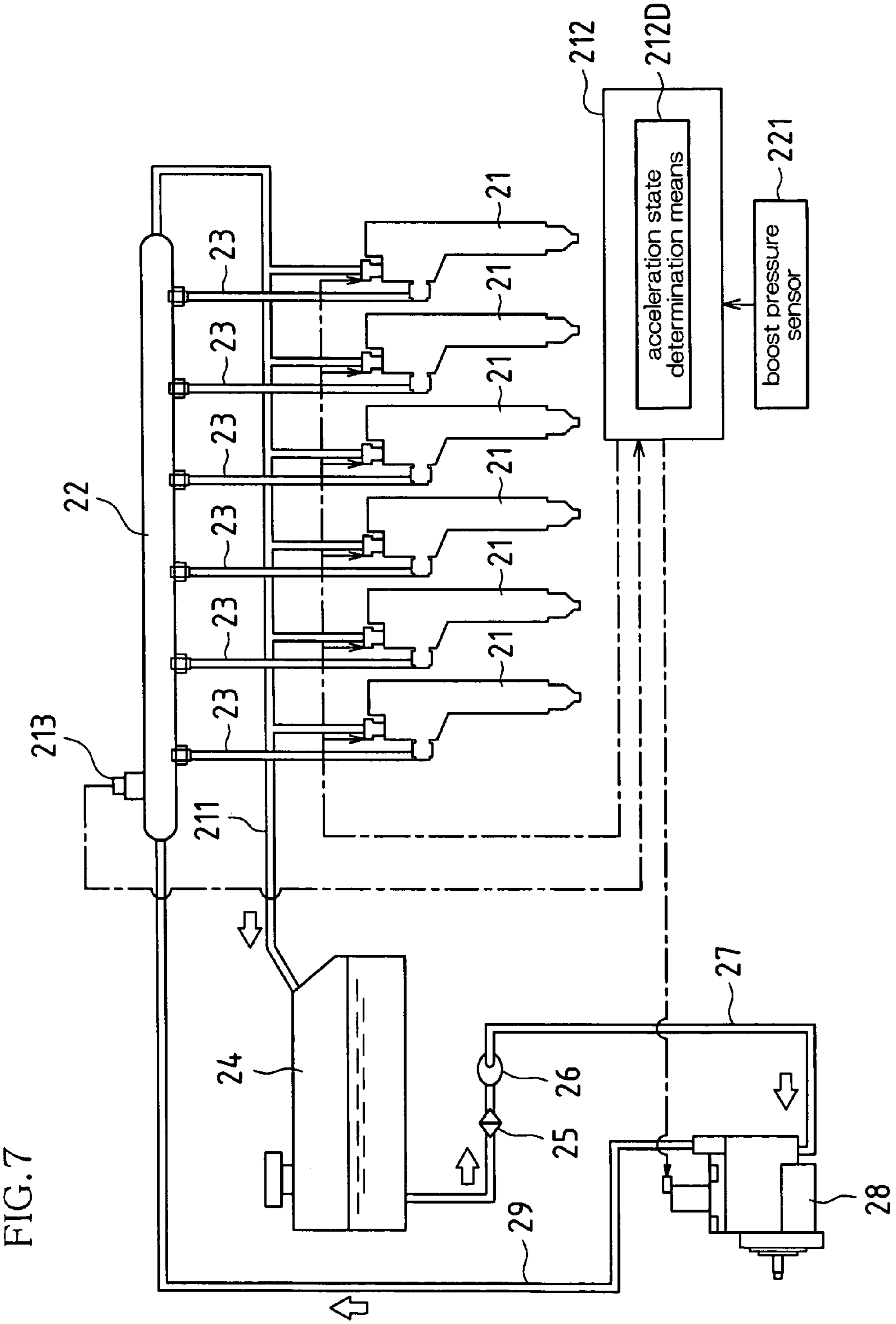
FIG. 7 is a schematic structure diagram of the accumulator-type fuel injection apparatus that is employed in a fuel injection amount control method for an engine with supercharger according to the second embodiment of the invention.

First, the overall structure of the fuel injection apparatus that is adopted in the engine according to the second embodiment is described. FIG. 7 shows an accumulator-type fuel injection apparatus provided in a six-cylinder marine diesel engine with supercharger (represented in FIG. 8). This accumulator fuel injection apparatus is provided with a plurality of fuel injection valves (hereinafter, referred to as injectors) 21 each of which is attached to a cylinder in the diesel engine with supercharger (hereinafter, referred to simply as engine), a common rail 22 that accumulates high-pressure fuel that is at relatively high pressure (common rail pressure: 100 MPa, for example), a high-pressure pump 28 that pressurizes the fuel that is sucked from a fuel tank 24 through a low-pressure pump (feed pump) 26 to a high pressure and then ejects this into the common rail 22, and a controller (ECU) 212 that electrically controls the injectors 21 and the high-pressure pump 28.

The high-pressure pump 28 is, for example, a so-called plunger-type supply fuel supply pump that is driven by the engine E and steps up the fuel to a high pressure determined based on the operation state, for example, and supplies this to the common rail 22 through a fuel supply pump 29. For example, the high-pressure pump 28 is linked to the crankshaft of the engine E in such a manner that motive force transmission via a gear (motive force transmission means in this invention) is possible. Other configurations that the motive force transmission means may adopt to achieve motive force transmission include providing both the drive shaft of the high-pressure pump 28 and the crankshaft of the engine E with pulleys, and then engaging a belt between the pulleys, and providing each shaft with a sprocket and engaging a chain between the sprockets.

Each injector 21 is attached to the downstream end of a fuel line that is in communication with the common rail 22. The injection of fuel from the injector 21 is controlled by conducting and stopping conduction of electricity (ON/OFF) to an injection control solenoid valve (not shown) that is integrally incorporated into the injector. That is, the injectors 21 inject the high-pressure fuel that has been supplied from the common rail 22 toward the combustion chamber of the engine E during the time that its injection control solenoid valve is open.

The controller 212 is supplied with various types of engine information such as the engine revolution and the engine load, and outputs a control signal to the injection control solenoid valve so as to obtain the most suitable fuel injection timing and fuel injection amount, which are determined from these signals. At the same time, the controller 212 outputs a control signal to the high-pressure pump 28 so that the fuel injection pressure becomes an ideal value based on the engine revolution or the engine load. Further, a pressure sensor 213 for detecting the common rail pressure is attached to the common rail 22, and the amount of fuel that the high-pressure pump 28 ejects to the common rail 22 is controlled so that the signal of the pressure sensor 213 becomes a preset ideal value based on the engine revolution or engine load.

The operation for supplying fuel to the injectors 21 is performed through a branched pipe 23 that constitutes a portion of the fuel channel from the common rail 22. That is, fuel is taken from the fuel tank 24 through a filter 25 by the low-pressure pump 26 and pressurized to a predetermined intake pressure and then delivered to the high-pressure pump 28 via the fuel line 27. The fuel that has been supplied to the high-pressure pump 28 is collected in the common rail 22 still pressurized to the predetermined pressure, and from the common rail 22 is supplied to each injector 21. A plurality of the injectors 21 are provided according to the engine E type (number of cylinders; in this embodiment, six cylinders), and under the control of the controller 212, the injectors 21 inject the fuel that has been supplied from the common rail 22 to the corresponding combustion chamber at an optimum fuel injection amount at an optimum injection timing. The injection pressure at which the fuel is injected from the injectors 21 is substantially equal to the pressure of the fuel being held in the common rail 22, so that controlling the pressure within the common rail 22 allows the fuel injection pressure to be controlled.

Fuel that is supplied to the injectors 21 from the branched pipes 23 but is not used up in the injection to the combustion chamber, and surplus fuel in a case where the common rail pressure is raised too high, is returned to the fuel tank 24 through a return pipe 211.

The controller 212, which is an electric control unit, is supplied with information on the cylinder number and the crank angle. The controller 212 stores, as mathematical functions, the target fuel injection conditions (for example, the target fuel injection timing, the target fuel injection amount, and the target common rail pressure), which are determined in advance based on the engine operation state so that the engine output becomes the optimum output for the operation state, and computes the target fuel injection conditions (that is, the fuel injection timing and the injection amount of the injector 21) in correspondence with the signals that indicate the current engine operation state, which is detected by various sensors, and then controls the operation of the injectors 21 and the fuel pressure within the common rail so that fuel injection is performed under those conditions.

Figure 8:
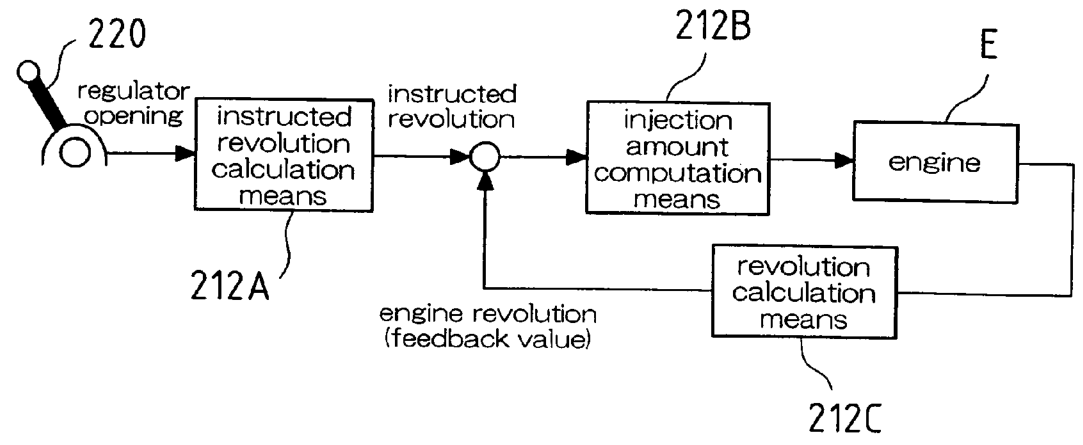
FIG. 8 is a control block diagram for determining the fuel injection amount of the same.

FIG. 8 is a control block structure diagram of the controller 212 for determining the fuel injection amount. As shown in FIG. 8, with regard to calculating the fuel injection amount, instructed revolution calculation means 212A receives a signal that indicates the degree of opening of a regulator 220, which is actuated by the user, and the instructed revolution calculation means 212A then calculates the "instructed revolution" corresponding to the amount that the regulator is open. Then, injection amount computation means 212B computes the fuel injection amount so that the engine revolution becomes this instructed revolution. The injectors 21 of the engine E perform the fuel injection operation using the fuel injection amount that has been found through this computation, and in this state, revolution calculation means 212C calculates the actual engine revolution and compares this actual engine revolution with the instructed revolution and corrects the fuel injection amount so that the actual engine revolution approaches the instructed revolution (feedback control).

As shown in FIG. 7, the controller 212 is also provided with acceleration state determination means 212D for determining an acceleration state of the engine E. The acceleration state determination means 212D determines that the engine is in a state of acceleration when the amount of change in the regulator opening that has been input to the controller 212 exceeds a predetermined value that has been set in advance.

A boost pressure sensor 221 for sensing the pressure of the supercharged air (boost pressure) from the supercharger that is supplied to the engine E also is provided, and the signal from the boost pressure sensor 221 is input to the controller 212. The controller 212 has the function of, through the boost compensator, adjusting the fuel injection amount from the injectors 21 according to the boost pressure that has been detected by the boost pressure sensor 221. Specifically, when the controller 212 has determined with the acceleration state determination means 212D that the engine E has transitioned to a state of acceleration, that is, when the engine E has transitioned to a transient state that is a state of acceleration, then even if the revolution of the engine E is low and boost pressure has not yet risen, the function employing the boost compensator suppresses the maximum injection amount of the fuel to the engine E so as to inhibit the discharge of black smoke. In this case, the function of adjusting the fuel injection amount with the boost compensator in accordance with the boost pressure is performed for a predetermined time (e.g. several seconds) after the engine E has transitioned to a state of acceleration, and this will be regarded as the boost compensator function effective period (expressed in FIG. 9).

Figure 9:
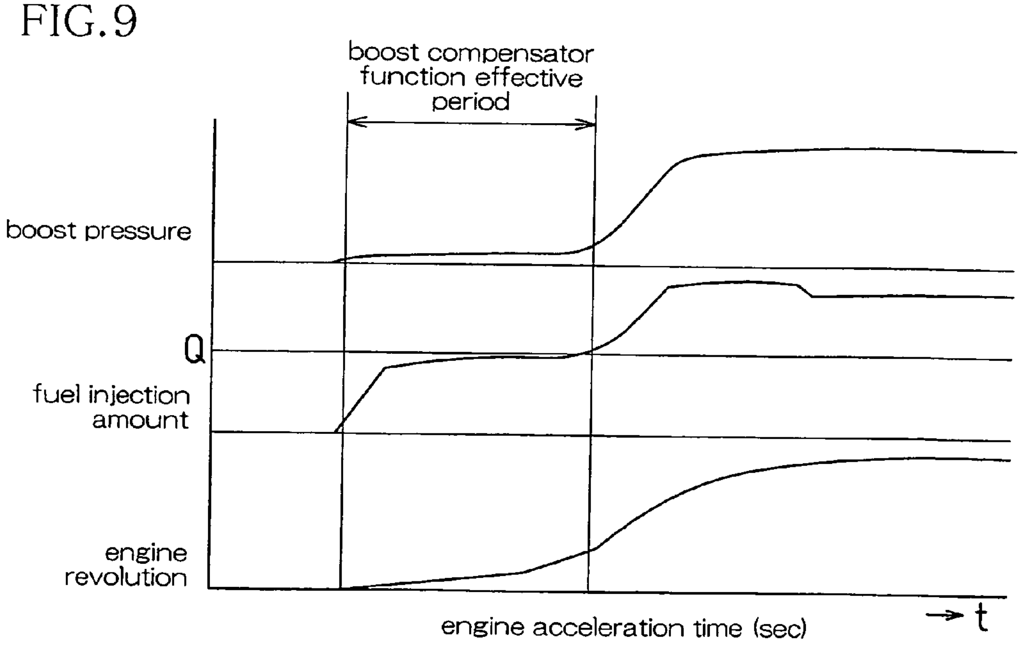
FIG. 9 is a property diagram that individually shows the characteristics of the boost pressure, fuel injection amount, and engine revolution, against the acceleration time of the engine of the same.

Then, as shown in FIG. 9, the controller 212 performs control to limit the maximum injection amount of fuel from the injectors 21 to under a predetermined value Q for a fixed period, that is, until the boost compensator function effective period has elapsed, when the acceleration state determination means 212D has determined that the engine E has transitioned to a state of acceleration, even if the boost pressure sensor 221 is damaged and it is not possible for the boost compensator to perform the fuel injection amount adjustment function according to the boost pressure.

Consequently, in the second embodiment, the controller 212 has the function of limiting the maximum injection amount of fuel from the injectors 21 to under a predetermined value Q until a fixed period (boost compensator function effective period) has elapsed when the acceleration state determination means 212D has determined that the engine E has transitioned to a state of acceleration, and thus even if the boost pressure sensor 221 is damaged and it is not possible for the boost compensator to perform the fuel injection amount adjustment function according to the boost pressure, the maximum injection amount of fuel from the injectors 21 is appropriately restricted when the engine E has transitioned to a state of acceleration, so that the maximum injection amount of the fuel does not exceed the predetermined value Q when the engine E is accelerating and the discharge of black smoke from the engine E is effectively inhibited. Moreover, the need to limit the maximum injection amount of fuel from the injectors 21 based on the boost pressure sensor 221 is eliminated and thus the boost pressure sensor 221 can be obviated altogether, and this eliminates cost increases due to the boost pressure sensor 221 and is very advantageous in terms of market competition.

Thus, without depending on the boost pressure sensor 221, the discharge of black smoke from the engine E can be effectively inhibited while a good acceleration state can be obtained.

Third Embodiment

Figure 10:
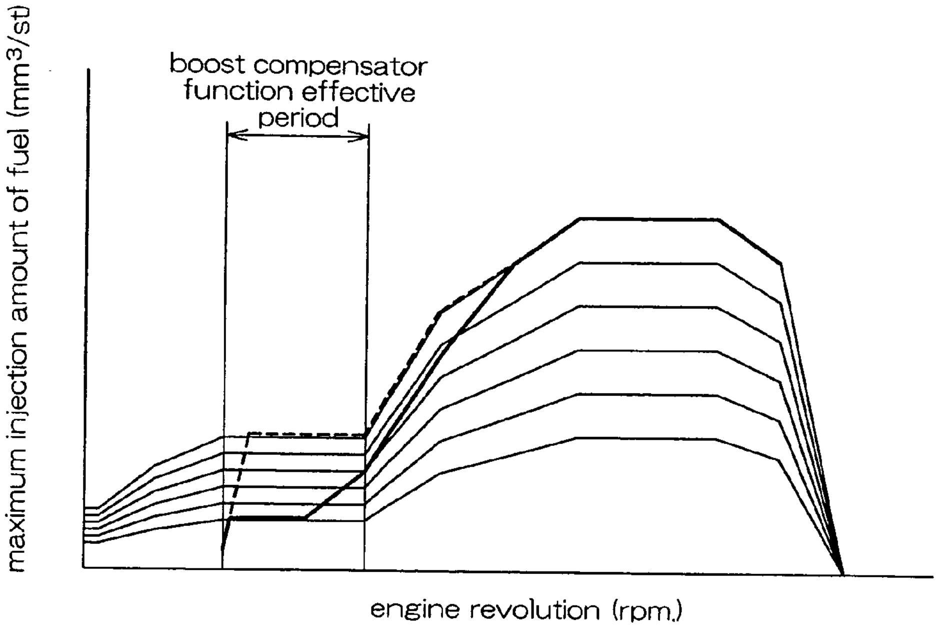
FIG. 10 is a property diagram showing the characteristics of the maximum fuel injection amount with respect to the engine revolution of the engine used in the fuel injection amount control method for an engine with supercharger according to the third embodiment of the invention.

A third embodiment of the invention is described next based on FIG. 10.

In this third embodiment, the configuration of the acceleration state determination means for determining the acceleration state of the engine has been altered. It should be noted that other than the acceleration state determination means, the configuration is the same as in the second embodiment, and identical components have been assigned identical reference numerals and are not described in detail.

In other words, in the third embodiment, the controller 212 is provided with acceleration state determination means for determining the acceleration state of the engine E, and the acceleration state determination means determines that the engine is in a state of acceleration when the amount of change in the actual revolution of the engine E that has been input to the controller 212 exceeds a predetermined value that has been set in advance. Then, as shown in FIG. 10, when the acceleration state determination means 212D has determined that the engine E has transitioned to a state of acceleration, even if the boost pressure sensor 221 is damaged and the fuel injection amount adjustment function of the boost compensator based on the boost pressure is not in effect, the controller 212 performs control to switch the fuel injection amount correction map from the steady-state characteristics (thick dashed line in FIG. 10) to the acceleration-state characteristics (thick solid line in FIG. 10) so as to limit the maximum injection amount of fuel from the injectors 21 to under a predetermined value Q during the period that the engine E is in a state of acceleration, that is, until the revolution of the engine after transitioning to a state of acceleration reaches a predetermined revolution N (boost compensator function effective period). It should be noted that the thin solid lines in FIG. 10 indicate the characteristics of the boost compensator map for switching the characteristics of the fuel injection amount with respect to the engine revolution among six levels according to the boost pressure that has been detected by the boost pressure sensor 221 when the boost pressure sensor 221 is operating normally.

Thus, in the third embodiment, the controller 212 has the function of limiting the maximum injection amount of fuel from the injectors 21 to under a predetermined value Q by switching the fuel injection amount adjustment map from the steady-state characteristics (thick dashed line in FIG. 10) to the acceleration-state characteristics (thick solid line in FIG. 10) when the acceleration state determination means has determined that the engine E has transitioned to a state of acceleration, and thus, even if the boost pressure sensor 221 has been damaged and the boost compensator cannot perform the fuel injection amount adjustment function as indicated by the characteristics of the boost compensator map based on the boost pressure, the maximum injection amount of fuel from the injectors 21 is appropriately restricted when the engine E has transitioned to a state of acceleration so that the maximum injection amount of the fuel does not exceed the predetermined value Q when the engine E is accelerating, thereby and effectively inhibiting the discharge of black smoke from the engine E. Moreover, the need to limit the maximum injection amount of fuel from the injectors 21 based on the boost pressure sensor 221 is eliminated and thus it is possible to obviate the boost pressure sensor 221 altogether, and this eliminates any increases in cost due to the boost pressure sensor 221 and is very beneficial in terms of market competition.

Thus, the discharge of black smoke from the engine E can be effectively inhibited and a good state of acceleration can be obtained without depending on the boost pressure sensor 221.

Fourth Embodiment

Figure 11:
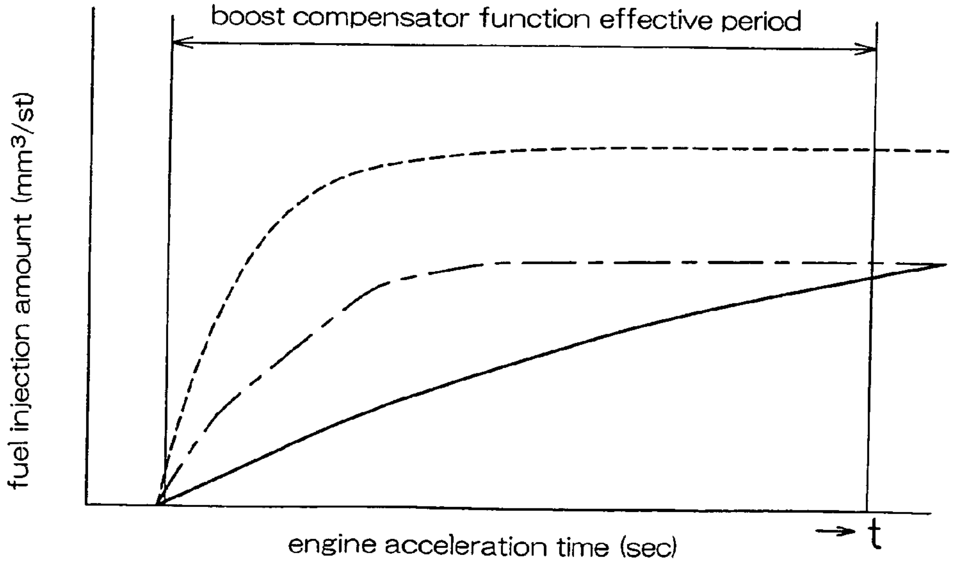
FIG. 11 is a property diagram showing a state in which the fuel injection amount with respect to the engine acceleration time in the boost compensator function effective period used in the fuel injection amount control method for an engine with supercharger according to the fourth embodiment of the invention has been processed by a large filtering constant.

A fourth embodiment of the invention is described next based on FIG. 11.

In this fourth embodiment, the configuration of the acceleration state determination means for determining the acceleration state of the engine has been altered. It should be noted that other than the acceleration state determination means, the configuration is the same as in the second embodiment and identical components have been assigned identical reference numerals and are not described in detail.

That is, in the fourth embodiment, the controller 212 is provided with acceleration state determination means 212D for determining the acceleration state of the engine E, and the acceleration state determination means 212D determines that the engine is in a state of acceleration when the amount of change in the regulator opening that has been input to the controller 212 exceeds a predetermined value that has been set in advance. Then, as shown in FIG. 11, when the acceleration state determination means 212D has determined that the engine E has transitioned to a state of acceleration, even if the boost pressure sensor 221 is damaged and as a the fuel injection amount adjustment function of the boost compensator based on the boost pressure is not in effect, the controller 212 performs control to significantly change the filtering constant of the amount of fuel to inject during acceleration of the engine E to transition from processing (dashed line in FIG. 11) that employs a first-order delay filtering constant for filtering through a general first-order filter to processing (solid line in FIG. 11) that employs a large filtering constant for filtering with respect to the characteristics according to the boost pressure that has been detected by the boost pressure sensor 221 (long-short dashed line in FIG. 11), so as to limit the maximum injection amount of fuel from the injectors 21 during the time that the engine E is in a state of acceleration, that is, until the revolution of the engine during acceleration reaches a predetermined revolution (boost compensator function effective period).

Thus, in the fourth embodiment, the controller 212 has the function of limiting the maximum injection amount of fuel from the injectors 21 to under a predetermined value Q by significantly changing the filtering constant of the fuel injection amount with respect to the acceleration time of the engine E to processing (solid line in FIG. 11) that employs a large filtering constant so as to effect filtering with respect to the characteristics according to the boost pressure that has been detected by the boost pressure sensor 221 (long-short dashed line in FIG. 11) until a filed period of time has elapsed (boost compensator function effective period) when the acceleration state determination means 212D has determined that the engine E has transitioned to a state of acceleration, and thus, even if the boost pressure sensor 221 is damaged and the boost compensator cannot perform the fuel injection amount adjustment function as designated by the properties of the boost compensator map according to the boost pressure, the maximum injection amount of fuel from the injectors 21 is appropriately limited when the engine E has transitioned to a state of acceleration so that the maximum injection amount of the fuel does not exceed a predetermined value Q when the engine E is in a state of acceleration and the discharge of black smoke from the engine E is effectively inhibited. Moreover, the need to limit the maximum injection amount of fuel from the injectors 21 based on the boost pressure sensor 221 is eliminated and thus it is possible to obviate the boost pressure sensor 221 altogether, and this eliminates any increases in cost due to the boost pressure sensor 221 and is very beneficial in terms of market competition.

Thus, the discharge of black smoke from the engine E can be effectively inhibited and a good state of acceleration can be obtained without depending on the boost pressure sensor 221.

It should be noted that the invention is not limited to the foregoing embodiments, and includes various other modified implementations thereof. For example, in the foregoing embodiments, if the acceleration state determination means determines that the engine E has transitioned to an acceleration state in a case where the boost pressure sensor 221 that is provided has broken, then control is performed so as to restrict the maximum injection amount of fuel from the injectors 21 to under a predetermined value Q until a fixed period (boost compensator function effective period) elapses, but the embodiments also can be adopted in a case where a boost pressure sensor has not been provided to begin with, and in such a case, there are no cost increases due to the boost pressure sensor and this is more advantageous in terms of market competition.

In the foregoing embodiments, the acceleration state determination means 212D determines that the engine is in a state of acceleration when the amount of change in the regulator opening exceeds a predetermined value that is set in advance, or the acceleration state determination means determines that the engine is in a state of acceleration when the amount of change in the actual revolution of the engine E exceeds a predetermined value that is set in advance, but of course it is also possible for the acceleration state determination means to determine that the engine is in a state of acceleration based on, for example, the amount of change in the total injection amount of fuel from the injectors, the amount of change in the revolution of the engine, the discrepancy between the target revolution and the actual revolution of the engine, the amount of change in the pressure within the common rail, or the discrepancy between the map value of the common rail pressure and the actual measured value.

Further, the foregoing embodiments describe cases in which the invention is adopted in a six-cylinder marine diesel engine with a supercharger, but the invention can also be adopted in various other types of engines as well, including four-cylinder marine diesel engines. There is no limitation to marine engines, and it is also possible to adopt the invention in engines that are used for other applications, such as for automobiles.

Fifth Embodiment

A fifth embodiment of the invention is described next with reference to the drawings.

Figure 12:
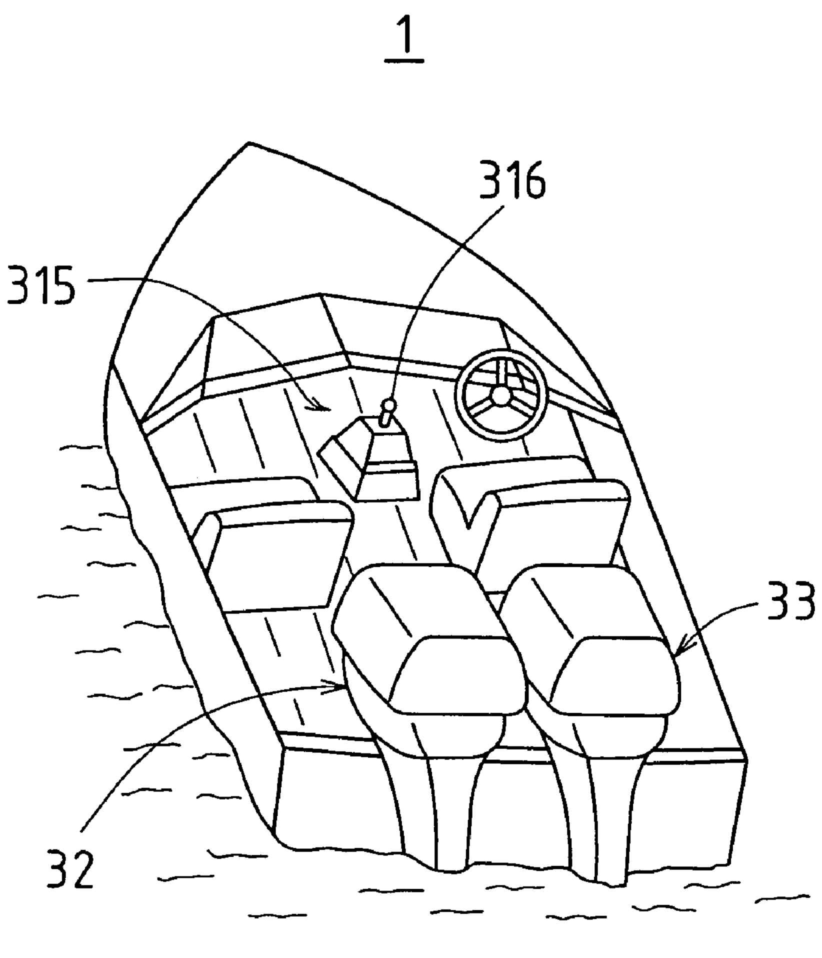
FIG. 12 is an external perspective view of a small boat furnished with a propulsion apparatus for a plurality of engines according to an embodiment of the invention.
Figure 13:
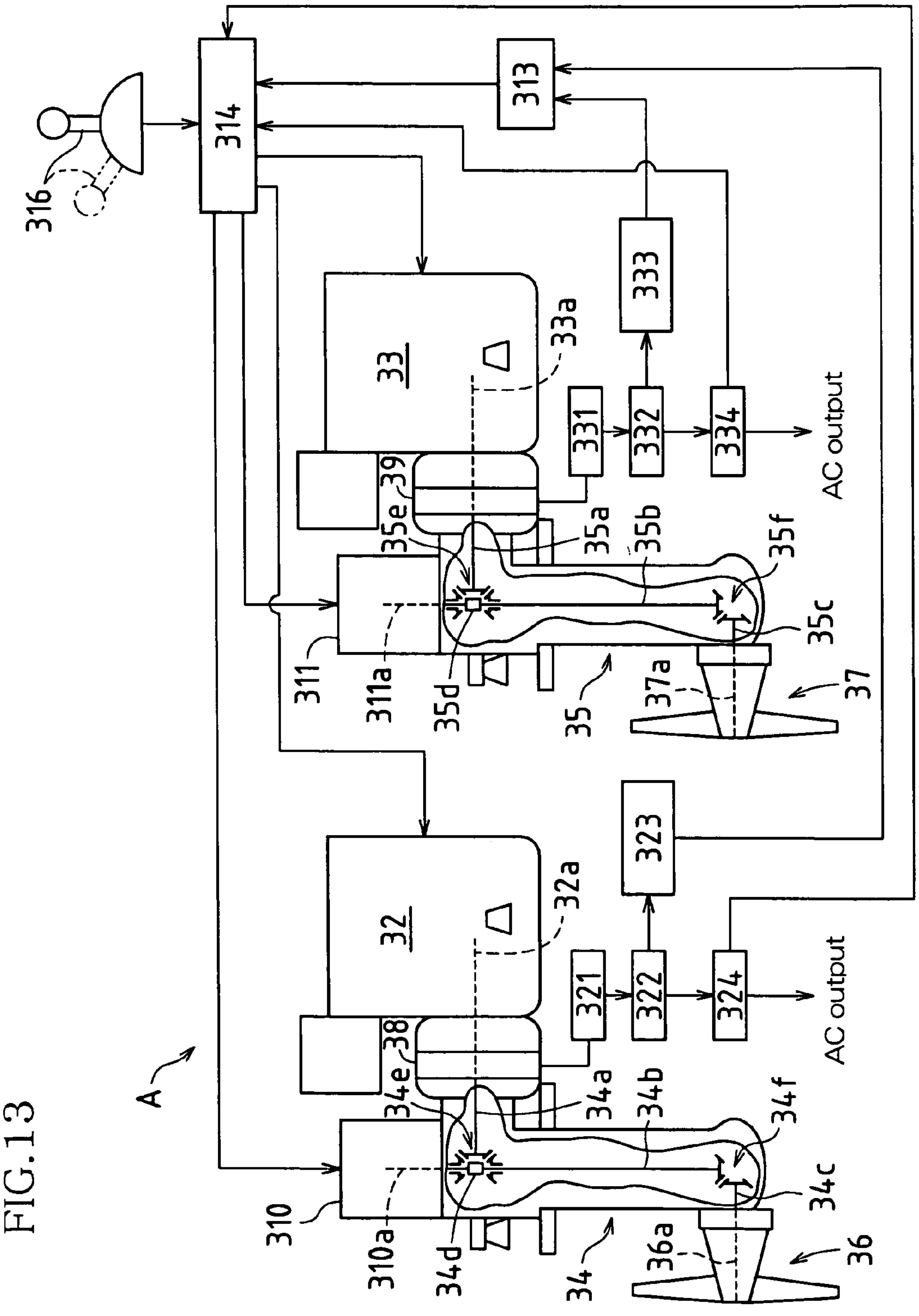
FIG. 13 is a diagram showing the configuration of the propulsion apparatus.

FIG. 12 is a perspective view of the external appearance of a small boat that is provided with a propulsion apparatus for a plurality of engines according to a fifth embodiment of the invention, FIG. 13 is a diagram that shows the configuration of the propulsion apparatus, and, as shown in FIG. 12, a small boat 31 is provided with two left and right engines 32 and 33.

In FIG. 13, a propulsion apparatus A has the left and right side engines 32 and 33, and left and right motive force transmission apparatuses 34 and 35, each of which is connected to a sail drive, and to propeller shafts 34*c* and 35*c* of the motive force transmission apparatuses 34 and 35 are individually connected left and right screw propellers 36 and 37. The drive force from the left engine 32 is reduced by the left motive force transmission apparatus 34 as it is transmitted to the left screw propeller 36, and as a result the left screw propeller 36 is rotatively driven. On the other hand, the drive force from the right engine 33 is reduced by the right motive force transmission apparatus 35 as it is transmitted to the right screw propeller 37, and as a result the right screw propeller 37 is rotatively driven. In the propulsion apparatus A, left and right power generating devices 38 and 39 having a power generator or power generator characteristics are disposed between the left and right engines 32 and 33 and the left and right motive force transmission apparatuses 34 and 35. The left and right engines 32 and 33 drive the left and right power generating devices 38 and 39, and the electric power that is generated is used to drive left and right electric motors 310 and 311, which are described later, or supplied as electric power for the boat.

Next, the motive force transmission routes from the left and right engines 32 and 33 to the left and right screw propellers 36 and 37 are described separately.

First, the motive force transmission route from the left engine 32 to the left screw propeller 36 is described. A crankshaft 32*a* of the left engine 32 and an input shaft 34*a* of the left motive force transmission apparatus 34, which is disposed substantially horizontally, are connected. In the left motive force transmission apparatus 34, the input shaft 34*a* is linked to an upper end portion of a transmission shaft 34*b*, which is disposed substantially vertically, by a first bevel gear portion 34*e* via a clutch 34*d*, and a lower end portion of the transmission shaft 34*b* and the propeller shaft 34*c* are linked by a second bevel gear portion 34*f*.

As regards the structure of the propeller shaft 34*c* of the left motive force transmission apparatus 34, it is connected to a drive shaft 36*a* of the left screw propeller 36, and the left screw propeller 36 is located at the shaft end of the propeller shaft 34*c*. The drive output of the left engine 32 is transmitted from the crankshaft 32*a* to the input shaft 34*a* of the left motive force transmission apparatus 34 and then is transferred to the drive shaft 36*a* of the left screw propeller 36 by way of the clutch 34*d*, the transmission shaft 34*b*, and the propeller shaft 34*c*. The clutch 34*d* associates and dissociates the input shaft 34*a* and the transmission shaft 34*b*, and when the rotation of the input shaft 34*a* is to be transmitted to the transmission shaft 34*b*, the clutch 34*d* has the function of switching the direction of that rotation.

The left electric motor 310 is arranged at an upper end portion of the left motive force transmission apparatus 34. An output shaft 310*a* of the left electric motor 310 is connected to the transmission shaft 34*b*.

The left power generating device 38 is for example constituted by a high-frequency power generator, and to the output portion of the power generating device 38 are connected a left relay (electromagnetic switch) 321, a left rectifier 322, and a left DC/DC converter 323, in that order. The electric power from the left power generating device 38 is rectified and smoothed by the left rectifier 322 and then converted to alternating current by an inverter 324 so that it can be supplied into the boat as alternating current electric power (AC electric power).

The motive force transmission route from the right engine 33 to the right screw propeller 37 is described next. A crankshaft 33*a* of the right engine 33 and an input shaft 35*a* of the right motive force transmission apparatus 35, which is disposed substantially horizontally, are connected. In the right motive force transmission apparatus 35, the input shaft 35*a* is linked to an upper end portion of a transmission shaft 35*b*, which is disposed substantially vertically, by a first bevel gear portion 35*e* via a clutch 35*d*, and a lower end portion of the transmission shaft 35*b* and the propeller shaft 35*c* are linked by a second bevel gear portion 35*f*.

As for the structure of the propeller shaft 35*c* of the right motive force transmission apparatus 35, it is connected to a drive shaft 37*a* of the right screw propeller 37, and the right screw propeller 37 is located at the shaft end of the propeller shaft 35*c*. The drive output of the right engine 33 is transmitted from the crankshaft 33*a* to the input shaft 35*a* of the right motive force transmission apparatus 35 and then is transferred to the drive shaft 37*a* of the right screw propeller 37 by way of the clutch 35*d*, the transmission shaft 35*b*, and the propeller shaft 35*c*. The clutch 35*d* associates and dissociates the input shaft 35*a* and the transmission shaft 35*b*, and when the rotation of the input shaft 35*a* is to be transmitted to the transmission shaft 35*b*, the clutch 35*d* has the function of switching the direction of that rotation.

The right electric motor 311 is arranged at an upper end portion of the right motive force transmission apparatus 35. An output shaft 311*a* of the right electric motor 311 is connected to the transmission shaft 35*b*. The right power generating device 39 is for example constituted by a high-frequency power generator, and to the output portion of the power generating device 39 are connected a right relay (electromagnetic switch) 331, a right rectifier 332, and a right DC/DC converter 333, in that order. The electric power from the right power generating device 39 is rectified and smoothed by the right rectifier 332 and then converted to alternating current by an inverter 334 so that it can be supplied into the boat as alternating current electric power (AC electric power).

The left and right DC/DC converters 323 and 333 are connected to a battery 313, which is connected to the left and right electric motors 310 and 311 via a controller 314 that serves as control means. The AC electric power that has been generated by the left and right power generating devices 38 and 39 is converted to direct current due to rectification and smoothing by the left and right rectifiers 322 and 332, and then is transformed to a predetermined voltage by the left and right DC/DC converters 323 and 333 and stored in the battery 313. The generation of power by driving the left and right power generating devices 38 and 39 and the storage of power in the battery 313 primarily is carried out using a portion of the output of the left and right engines 32 and 33. The left and right relays 321 and 331 are configured such that, due to switch control by the controller 314, they can switch whether or not to supply the output of the left and right power generating devices 38 and 39 into the boat or whether or not to store it in the battery 313.

The left and right electric motors 310 and 311 are driven by the electric power stored in the battery 313, and the driving of the electric motors 310 and 311 is controlled by the controller 314.

Figure 14:
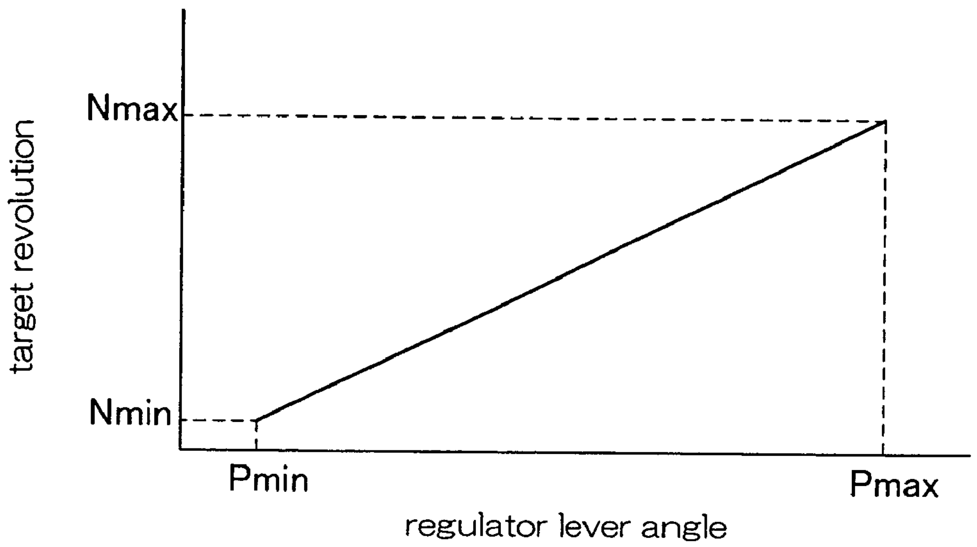
FIG. 14 is a property diagram that shows the characteristics of the target revolution of the engines with respect to the regulator lever angle.

A characteristic feature of the invention is that, as shown in FIG. 12, in a cockpit 3115 of the small boat 31 is provided a single regulator lever 316 for synchronously adjusting the output of the left and right engines 32 and 33, that is, the propeller shafts 34*c* and 35*c* of the left and right motive force transmission apparatuses 34 and 35. As shown in FIG. 13, the regulator lever 316 is designed so that it can be actuated over a lever angle from a position P1 to a position P2, and the data on the actuated lever angle is input to the controller 314, which is connected to the regulator lever 316. Within the controller 314, the target revolutions of the engines 32 and 33 with respect to the lever angle of the regulator lever 316 are set according to a map as shown in FIG. 14.

When the output of one of the left and right engines, such as the left engine 32, drops (e.g. from 2000 rpm to 1500 rpm), the controller 314 performs control to lower the revolution of the propeller shaft 35*c* of the remaining other right engine 33 to a revolution that is in synchronization with the revolution of the propeller shaft 34*c* of the left engine 32, whose output has dropped. When the output of the left engine 32, whose output has dropped, drops further (for example, a drop from 1500 rpm to 500 rpm) or stops and it is no longer possible to obtain a propelling force, then the controller 314 terminates control for tuning the revolution of the propeller shaft 35*c* of the remaining right engine 33 to the revolution of the propeller shaft 34*c* of the left engine 32, and performs a change in control so that only the revolution of the propeller shaft 35*c* of the remaining right engine 33 is adjusted by the regulator lever 316.

Thus, in, this fifth embodiment of the invention, when there is a drop in the output of one of the left and right engines 32 and 33, such as the left engine 32, control is performed to lower the revolution of the propeller shaft 35*c* of the remaining other right engine 33 to a revolution that is in synchronization with the revolution of the propeller shaft 34*c* of the left engine 32, whose output has dropped, and thus even if a fuel injection problem due to the fuel injection valve, for example, causes a drop in the output of the left engine 32 of the engines 32 and 33, reducing the revolution of the propeller shaft 34*c*, it is possible to tune the left and right engines 32 and 33 using a single regulator lever 316 without causing a difference in between this revolution and the revolution of the propeller shaft 35*c* of the remaining other normal right engine 33.

When there is a further drop or complete stop in the output of the left engine 32 and it is no longer possible to obtain a propelling force, then control for lowering the revolution of the propeller shaft 35*c* of the remaining right engine 33 to synchronize it to the revolution of the propeller shaft 34*c* of the left engine 32 is terminated, and instead only the revolution of the propeller shaft 35*c* of the remaining right engine 33 is adjusted by the regulator lever 316, and thus pointless tuning of a left engine 32 that can no longer obtain a propelling force due to a further drop or complete stop of its output and a normal right engine 33 is avoided, and under these circumstances, in which a significant drop in output is unavoidable, the output resulting from the normal right engine 33 that remains is secured so that the performance of the left and right engines 32 and 33 can be maintained.

It should be noted that the invention is not limited to the foregoing fifth embodiment, and includes various other modifications thereof. For example, the fifth embodiment was described with regard to a case in which the small boat 31 is furnished with two engines, a left and a right engine 32 and 33, but of course it is also possible to adopt the invention in a boat that is furnished with three or more engines. In this case, the rotational velocities of the propeller shafts of the three or more engines are synchronously adjusted by a single regulator lever, and when the output drops in at least one of the engines, the controller will perform control so as to lower the revolution of the propeller shafts of the other engines to a revolution that is in synchronization with that of the propeller shaft of the engine whose output has dropped.

The fifth embodiment presented a sail drive configuration in which the left and right motive force transmission apparatuses 34 and 35 extend significantly below the engines 32 and 33, and the screw propellers 36 and 37 are directly attached to the left and right motive force transmission apparatuses 34 and 35, but it is also possible to adopt a marine gear configuration in which the screw propeller shafts of the screw propellers are mounted to a rear end portion of the motive force transmission apparatuses.

Sixth Embodiment

A sixth embodiment of the invention is described next with reference to the drawings.

Figure 15:
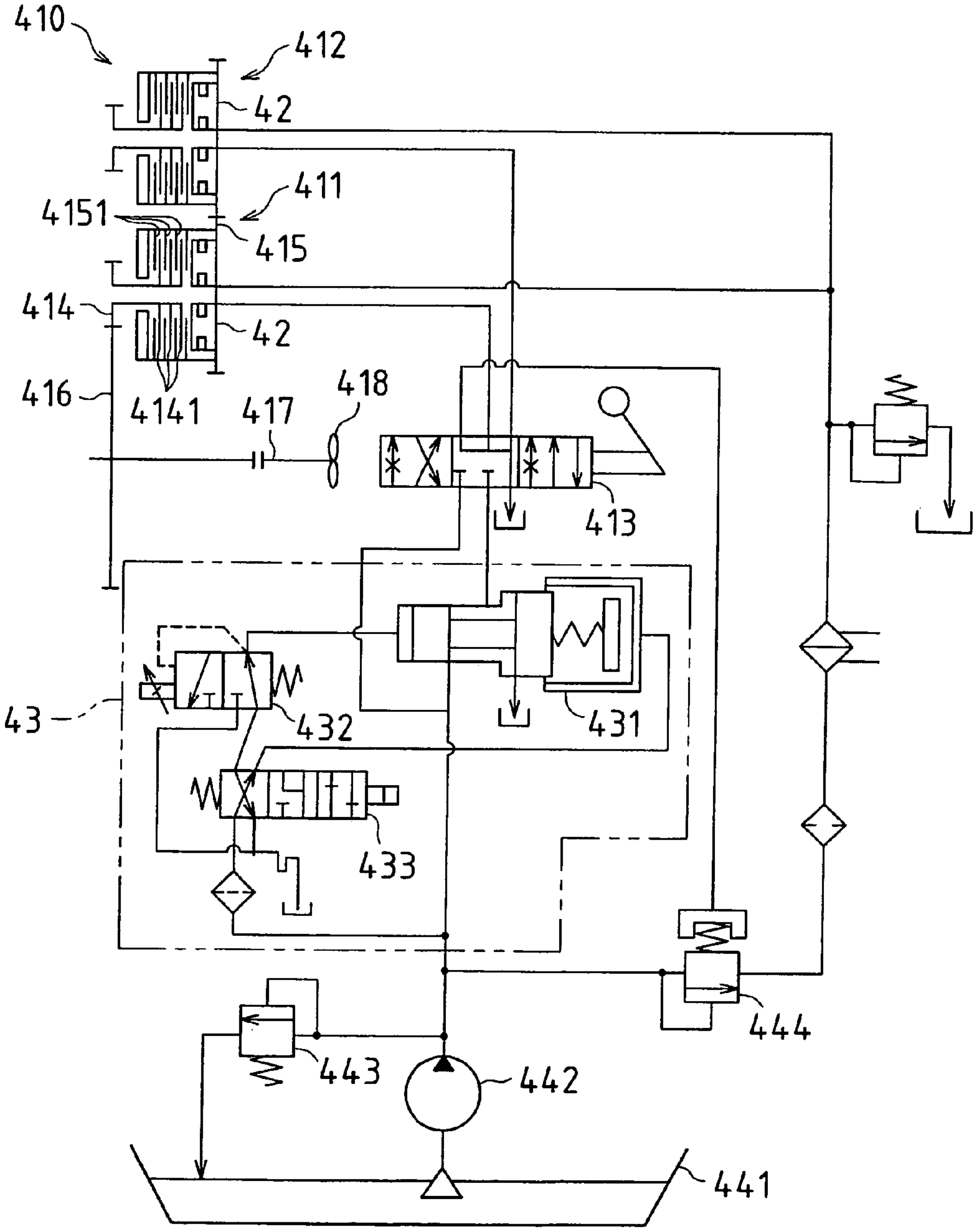
FIG. 15 is an oil circuit diagram of a marine reduction and reversal device according to an embodiment of the invention.

FIG. 15 is an oil circuit diagram of a marine reduction and reversal device according to the sixth embodiment of the invention.

In FIG. 15, a forward clutch 411 and a reverse clutch 412 are disposed in parallel, and by actuating a forward reverse switch valve 413, the destination to which to supply the pressure oil can be switched between the forward clutch 411, the reverse clutch 412, or to an intermediate position between these.

Friction plates 4141 and steel plates 4151 are disposed in alternation in a hydraulic piston 42, and the friction plates 4141 are linked to an inner gear 414 (pinion gear) and the steel plates 4151 are linked to an outer gear 415 that is always rotating. When these are pressed against one another in the hydraulic piston 42, the outer gear 415 and the inner gear 414 become a single unit and rotate together, which in turn rotates a large gear 416 that meshes with the inner gear 414 and transmits the motive force to a propeller 418 through an output shaft 417. By increasing and decreasing the pressing force (clutch hydraulic pressure) of the hydraulic piston 42, the friction plates 4141 and the steel plates 4151 can be slipped, that is, put into a half-clutch state. The clutch hydraulic pressure of the hydraulic piston 42 is controlled by an electric trolling device 43 that is within the double dotted dashed line in FIG. 15.

The electric trolling device 43 is supplied with pressure oil via a low speed valve 431 and the forward reverse switch valve 413, and pushes against the hydraulic piston 42 of the forward clutch 422 or the reverse clutch 412. A controlled pressure balanced by the pressure oil of a proportional solenoid valve 432 and a spring is input to the low speed valve 431.

FIG. 15 shows a state in which a direct solenoid valve 433 has been switched in the direct-link direction, and when in this state the forward reverse switch valve 413 is switched to the forward position or the reverse position, the high clutch hydraulic pressure completely pushes in the hydraulic piston 42 and thus is the motive force from the outer gear 415 completely transmitted to the inner gear 414, and in this case, slipping at the forward clutch 411 or the reverse clutch 412 does not occur. When the direct solenoid valve 433 is switched to the opposite direction, pressure oil is input to the low speed valve 431 through the proportional solenoid valve 432, and with the proportional solenoid valve 432 it is possible to adjust the hydraulic pressure that has been delivered from the low speed valve 431. Then, controlling the proportional solenoid valve 432 to adjust the hydraulic pressure that has been delivered from the low speed valve 431 makes it possible to control the insertion pressure within the forward clutch 411 and the reverse clutch 412. It should be noted that in FIG. 15, reference numeral 441 denotes an oil strainer, 442 denotes an oil pump, 443 denotes a safety valve, and 444 denotes a clutch pressure adjustment valve.

Figure 16:
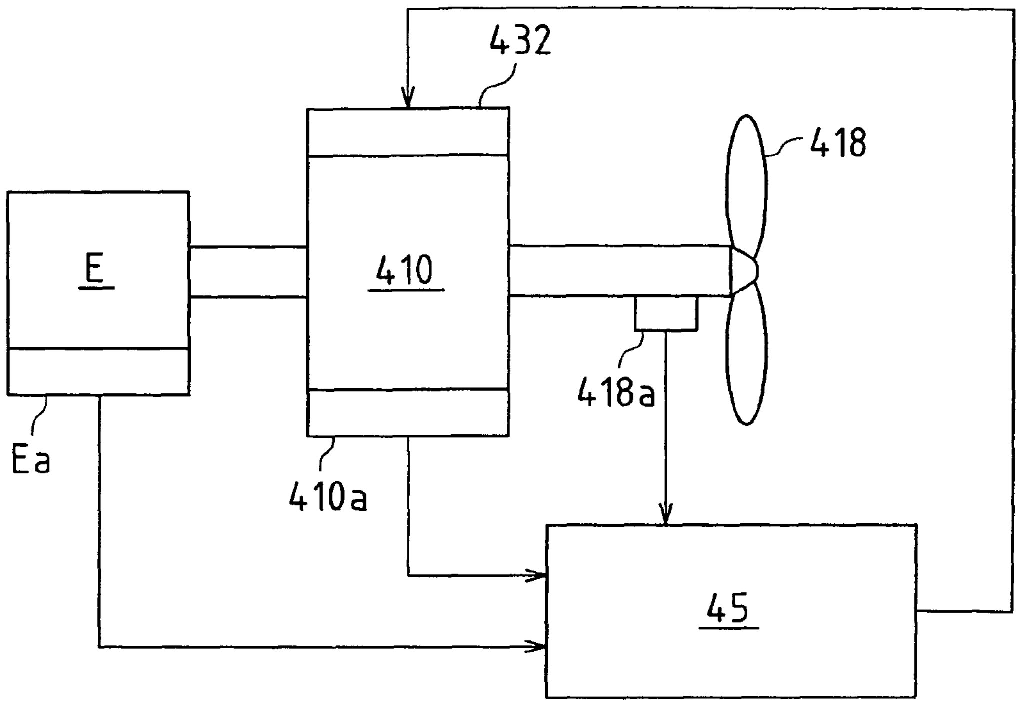
FIG. 16 is a schematic structure diagram of the marine reduction and reversal device.

As shown in FIG. 16, the drive force of a diesel engine E is transmitted to the propeller 418 via a clutch mechanism 410 that is constituted by the forward and reverse clutches 411 and 412. The diesel engine E is furnished with an engine revolution sensor Ea that detects the actual revolution of the engine, the clutch mechanism 410 is furnished with a clutch signal detection sensor 410*a* that detects whether the clutch mechanism 410 is in a state where the forward clutch 411 is connected, is in a state where the reverse clutch 412 is connected, or is in an intermediate state in which neither the forward clutch 411 or the reverse clutch 412 are connected, and the propeller 418 is furnished with a propeller revolution sensor 418*a* that detects the propeller revolution.

The controller 45 receives the detection signals from the engine revolution sensor Ea, the clutch signal detection sensor 410*a*, and the propeller revolution sensor 418*a*, and the output of the controller 45 is input to the proportional solenoid valve 432, which is an actuator for controlling the insertion pressure of the forward and reverse clutches 411 and 412.

The controller 45 performs control such that the boost compensator detects the pressure (boost pressure) of the supercharged air that is supplied to the diesel engine E and adjusts the fuel injection amount. The amount of fuel that is injected to the diesel engine E due to the boost compensator is suppressed when the load on the diesel engine E lowers the actual revolution and causes the boost pressure to become low.

The flow of the control by the controller 45 when boat that is moving forward is to be stopped, which is a characteristic feature of this invention, is described with reference to the flowchart of FIG. 17.

Figure 17:
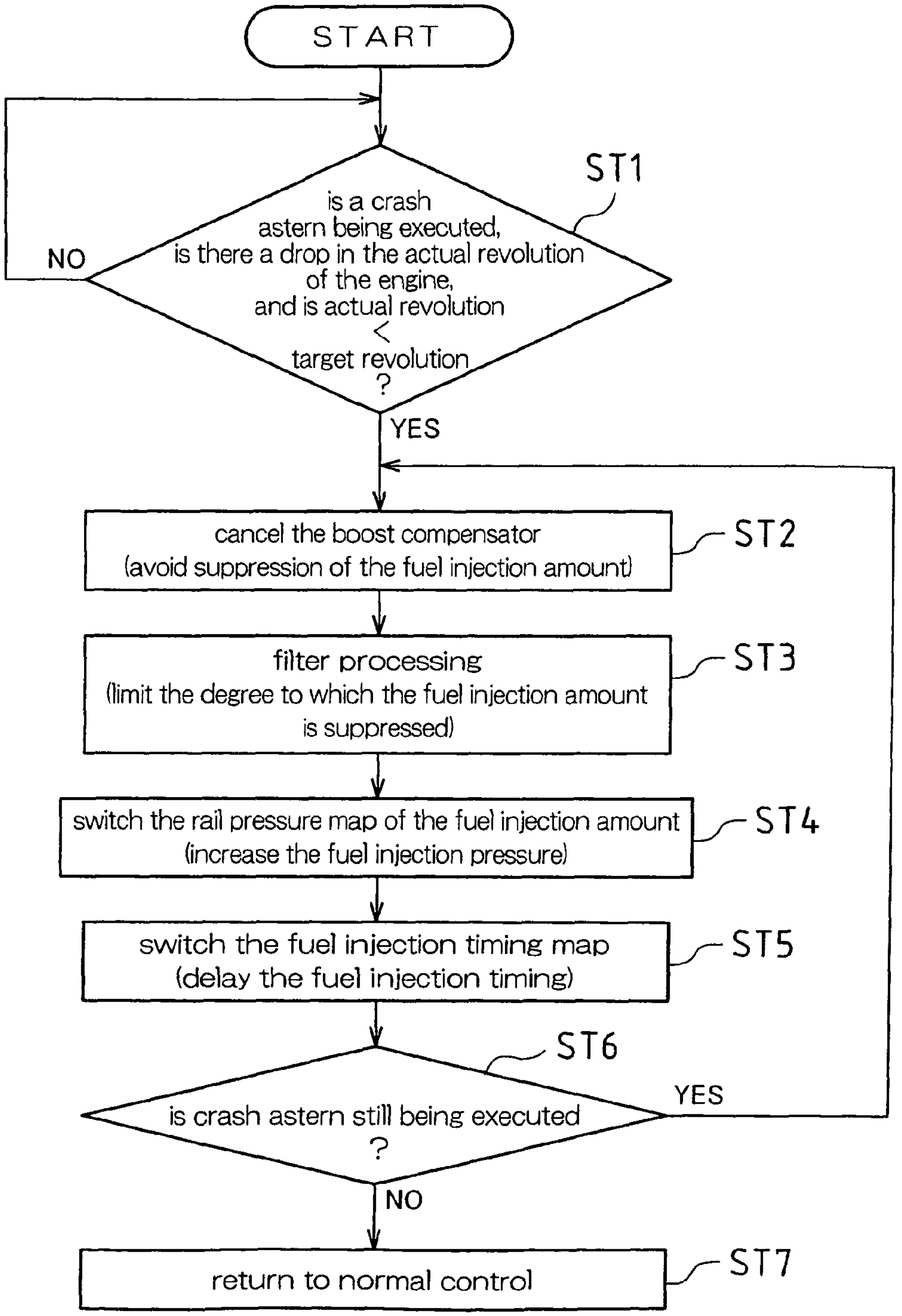
FIG. 17 is a flowchart diagram showing the flow of control by the controller when a ship moving forward is to be stopped.

In step ST1 of the flowchart of FIG. 17, when it is determined that a crash astern is being executed in which the forward reverse switch valve 413 is switched from the forward position to the reverse position to push the hydraulic piston 42 of the reverse clutch 412 when a forward-moving boat is to be stopped, and the actual revolution of the diesel engine E from the engine revolution sensor Ea has dropped and it is determined that the actual revolution of the diesel engine E is lower than the target revolution, then in step ST2, an engine stall avoid control is performed by terminating the fuel injection amount adjustment by the boost compensator based on the boost pressure in order to avoid suppression of the fuel injection amount in conjunction with the drop in the actual revolution of the diesel engine E during execution of the crash astern.

Figure 18:
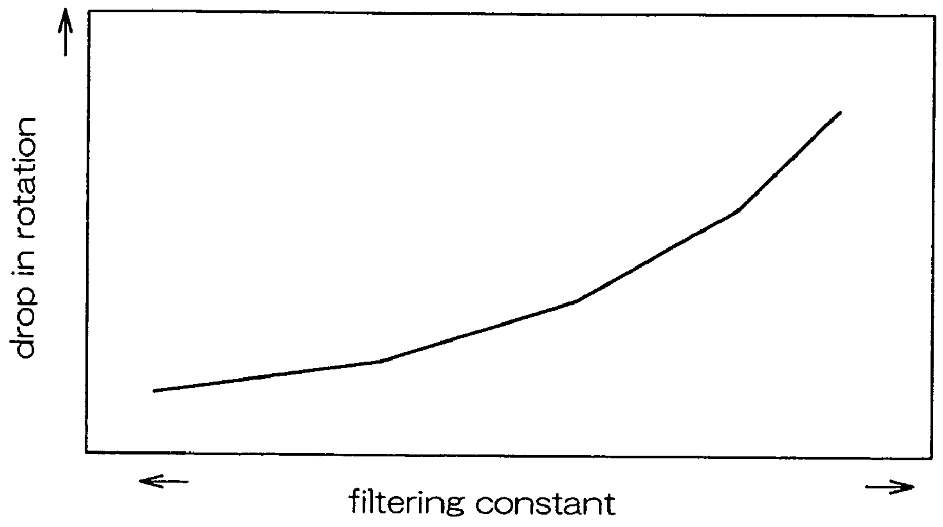
FIG. 18 is a property diagram showing the characteristics of the drop in revolution of the diesel engine with respect to the filtering constant.

Next, in step ST3, as shown in FIG. 18, to prevent stalling due to the filtering process, which is closely related to the amount of the drop in the actual revolution of the diesel engine E, the amount of the drop in the actual revolution of the diesel engine E with respect to the filtering constant is changed to reduce the amount of the drop in the actual revolution of the diesel engine E during execution of the crash astern, so as to limit the amount by which the fuel injection amount is suppressed.

Figure 19:
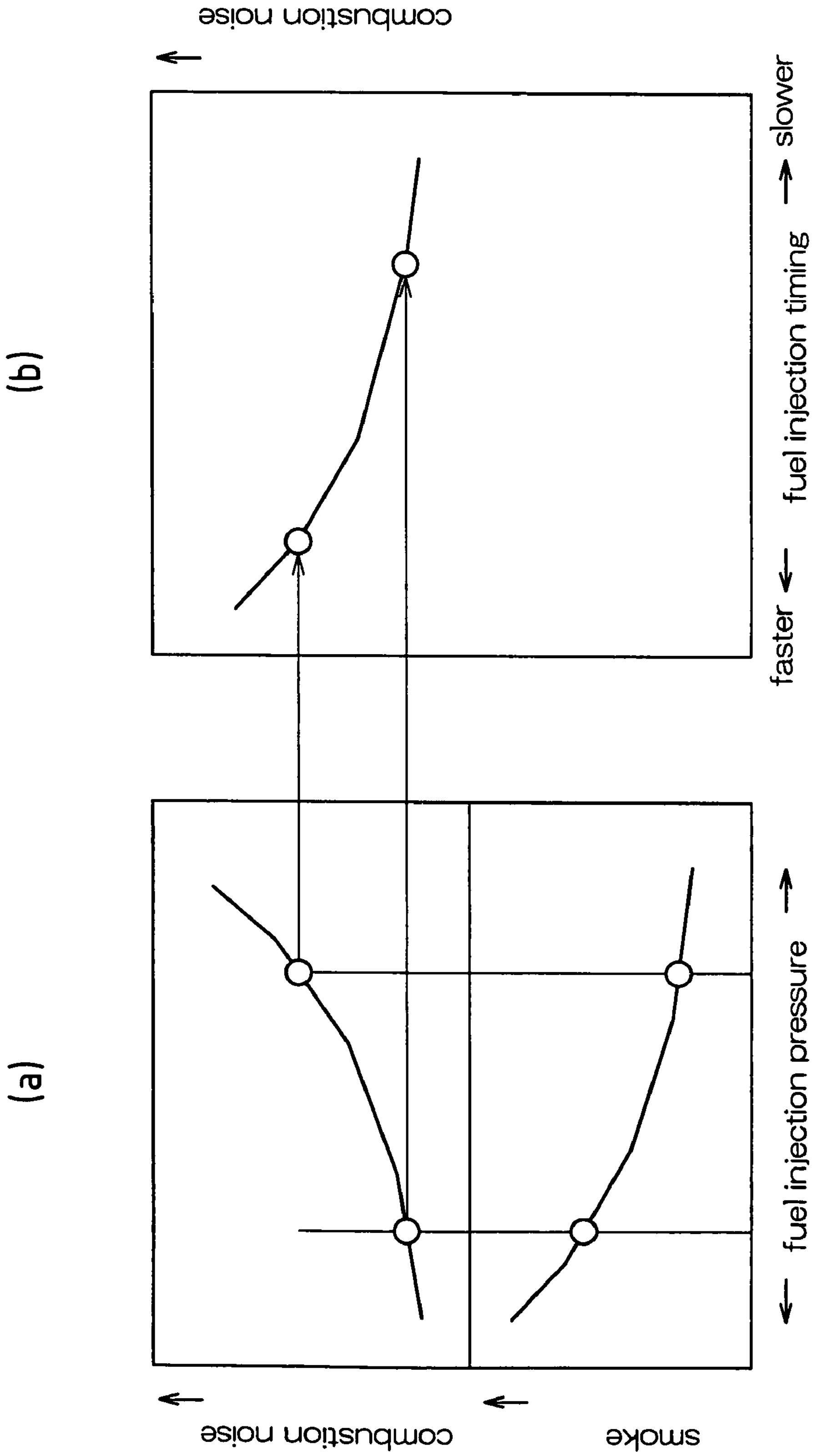
FIG. 19(*a*) is a property diagram showing the characteristics of the amount of smoke and combustion noise versus fuel injection pressure, and FIG. 19(*b*) is a property diagram showing the characteristics of the combustion noise versus fuel injection timing.

Then, in step ST4, an injection pressure increase control that involves increasing the fuel injection pressure is performed in addition to the two engine stall avoid controls. Specifically, the rail pressure map of the injection fuel that is held under pressure in the common rail so that it may be supplied to the diesel engine E from injectors (not shown) is switched, raising the pressure of the injection fuel within the common rail (fuel injection pressure). At this time, as shown in FIG. 19(*a*), the increase in the fuel injection pressure effectively inhibits the occurrence of smoke (black smoke), which increases as the fuel injection amount is increased due to the engine stall avoid control.

Next, in step ST5, in addition to the above injection pressure increase control, injection timing lag control for delaying the fuel injection timing is performed. Specifically, the fuel injection timing map is switched in order to delay the fuel injection timing. At this time, as shown in FIG. 19(*b*), the fuel noise, which becomes large as the fuel injection pressure is increased due to the injection pressure increase control, is effectively suppressed due to the delay in fuel injection timing.

Subsequently, in step ST6, it is determined whether or not the crash astern is still being executed, and if the result is YES, the crash astern is still being executed, then the procedure is returned to step ST2. On the other hand, if the determination of step ST6 that NO, the crash astern has been terminated, then in step ST7 the controls when it is determined that a crash astern is being executed are cancelled so as to return to the normal controls that are in effect before execution of the crash astern. That is, during the crash astern, the engine stall avoid controls involving terminating the fuel injection amount adjustment based on the boost pressure by the boost compensator, and filtering to reduce the drop in actual revolution of the diesel engine E, the injection pressure increase control for increasing the fuel injection pressure, and the injection timing lag control for delaying the fuel injection timing, are returned to the normal control that is in effect before execution of the crash astern.

Thus, in this embodiment, when during the crash astern there is a drop in the actual revolution of the diesel engine E and that actual revolution falls below the target revolution, engine stall avoid control is performed through a combination of stopping fuel injection amount adjustment by the boost compensator and performing a filtering process to reduce the drop in the actual revolution of the diesel engine E, and thus, even if the forward reverse switch valve 413 is switched from the forward position to the reverse position when executing the crash astern, thereby placing a load on the diesel engine E and accordingly lowering the actual revolution, as long as the engine stall avoid control is implemented by canceling the fuel injection amount adjustment by the boost compensator in accordance with the boost pressure, then the fuel injection amount will not be suppressed along with the drop in actual revolution of the diesel engine during execution of the crash astern. Further, if engine stall avoid control is performed by changing the filtering constant with the aim of increasing the control response speed of the diesel engine E, in addition to the engine stall avoid control involving cancellation of the boost compensator, then the drop in the actual revolution of the diesel engine during the crash astern is reduced so that the degree to which the fuel injection amount is suppressed is kept low. Thus, combining the two engine stall avoid controls allows stalling due to control by the boost compensator during a crash astern to be avoided and also allows the ship to be stopped rapidly.

Further, since injection pressure increase control for increasing the fuel injection pressure is performed in addition to the above engine stall avoid controls, the rail pressure map of the injection fuel that is held under pressure in the common rail for supply from the injectors to the diesel engine E is switched to increase the pressure of the injection fuel (fuel injection pressure) within the common rail, and thus the generation of smoke (black smoke), which increases along with the increase in the fuel injection amount due to the engine stall avoid control, can be effectively inhibited.

Also, injection timing lag control for delaying the fuel injection timing is performed in addition to the injection pressure increase control, and thus combustion noise, which increases along with the increase in fuel injection pressure due to the injection pressure increase control, can be effectively inhibited by delaying the fuel injection timing.

Further, when it has been determined that the crash astern is over, the controls when it has been determined that the crash astern is being executed are terminated to return to the normal control before execution of the crash astern, and thus the engine stall avoid control, the injection pressure increase control, and the injection timing lag control during execution of the crash astern are returned to the normal control in effect prior to crash astern execution, thereby lowering the smoke (black smoke), which increases due to the increase in the fuel injection amount due to the engine stall avoid control during the crash astern, and the combustion noise, which becomes large as the fuel injection pressure is increased due to the fuel pressure increase control, for example, to their original levels when it is determined that the crash astern has been terminated.

Figure 20:
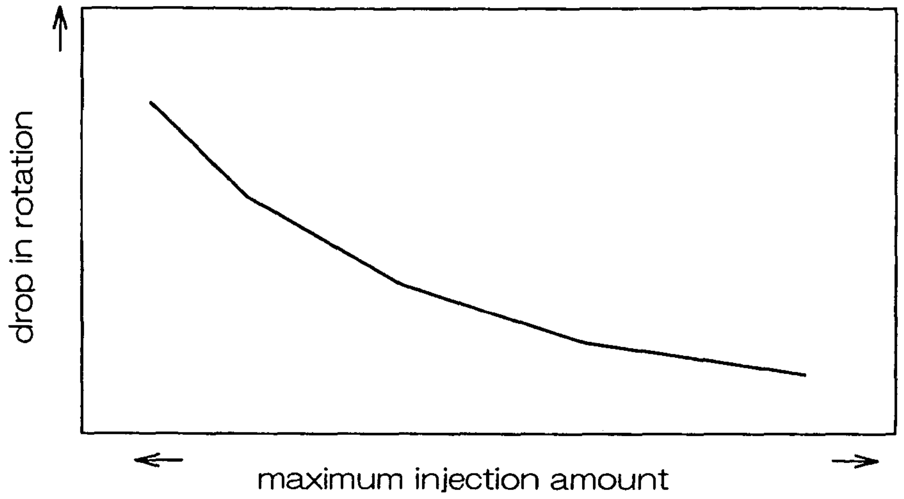
FIG. 20 is a property diagram showing the characteristics of the amount of drop in the revolution of the diesel engine versus the maximum injection amount of fuel according to a modified example.
Figure 21:
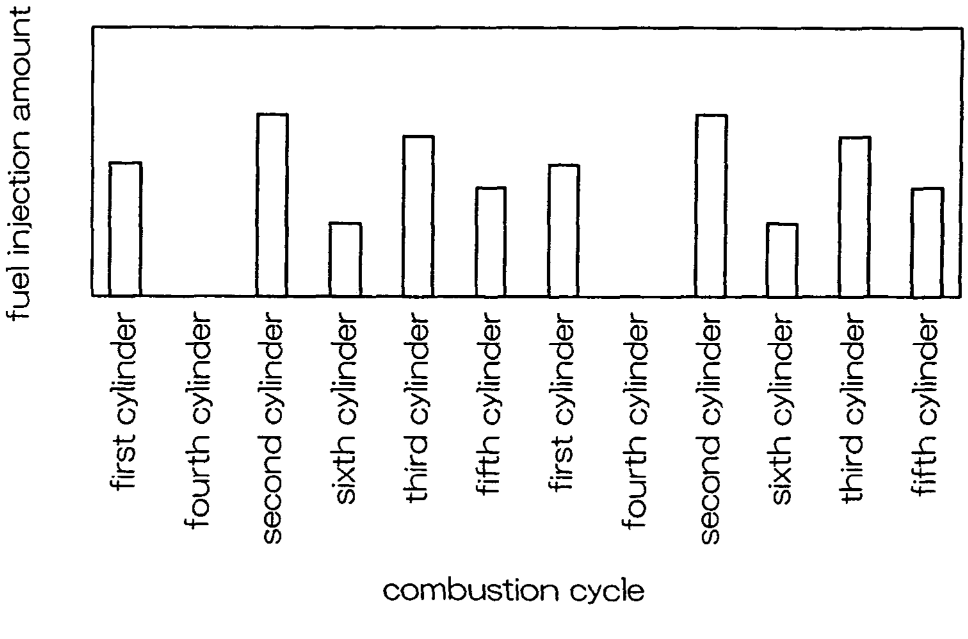
FIG. 21 is a property diagram showing the fuel injection amount of each cylinder in its combustion cycle when the supply of fuel by injection from an injector to a certain cylinder of the engine according to a conventional example has become impossible.

It should be noted that the invention is not limited to the foregoing sixth embodiment, and includes various other modifications thereof. For example, in the sixth embodiment, when during the crash astern there is a drop in the actual revolution of the diesel engine E and that actual revolution falls below the target revolution, engine stall avoid control is performed by combining stopping fuel injection amount adjustment by the boost compensator and changing the filtering process constant with the aim of increasing the control response speed of the diesel engine E, but as shown in FIG. 20, in addition to the two engine stall avoid controls discussed above, it is also possible to perform an engine stall avoid control that involves changing the fuel injection amount adjustment map so as to change the amount of the drop in the actual revolution of the diesel engine E with respect to the maximum injection amount of the fuel in order to increase the fuel injection amount with the boost compensator based on the boost pressure, and it is also possible to perform the individual engine stall avoid controls independently.

In the sixth embodiment, the engine stall avoid control is performed when it has been determined that the crash astern is being executed due to switching the forward reverse switch valve 413 from the forward position to the reverse position, and it has also been determined from the engine revolution sensor Ea that the actual revolution of the diesel engine E has dropped below the target revolution, but it is also possible to perform engine stall avoid control when it has been determined that a crash astern is being executed by switching the forward reverse switch valve 413 from the forward position to the reverse position when a forward moving marine vessel is to be stopped, the actual revolution of the diesel engine has dropped, and the fuel injection amount has reached the limit amount due to the fuel injection amount adjustment by the boost compensator based on the boost pressure.

It should be noted that the present invention can be worked in various other forms without deviating from the basic characteristics or the spirit thereof. Accordingly, the embodiments given above are in all respects nothing more than examples, and should not be interpreted as being limiting in nature. The scope of the present invention is indicated by the claims, and is not restricted in any way to the text of this specification. Furthermore, all modifications and variations belonging to equivalent claims of the patent claims are within the scope of the present invention.

Also, this application claims priority right on the basis of Japanese Patent Application 2004-204353, Japanese Patent Application 2004-204357, Japanese Patent Application 2004-204358, and Japanese Patent Application 2004-204359, which were submitted in Japan on Jul. 12, 2004, the entire contents of which are herein incorporated by reference.

INDUSTRIAL APPLICABILITY

The present invention can be adopted in various types of engines, including marine engines, and for example, it can be adopted in engines that are used in other applications, such as in automobiles.

The invention claimed is:

1. A fuel injection control method during crash astern in a marine engine with reduction and reversal device, wherein when it has been determined that a crash astern has been executed by switching a clutch from forward to reverse when a forward moving ship is to be brought to a stop, and an actual revolution of the engine becomes smaller and falls below a target revolution, then engine stall avoid control that involves at least one of, or a combination of a plurality of, terminating fuel injection amount adjustment by a boost compensator in accordance with a boost pressure, changing a fuel injection amount adjustment map so as to result in an increase in the fuel injection amount by the boost compensator in accordance with the boost pressure, and changing a filtering process constant with the aim of increasing the control response speed.

2. A fuel injection control method during crash astern in a marine engine with reduction and reversal device, wherein when it has been determined that a crash astern has been executed by switching a clutch from forward to reverse when a forward moving ship is to be brought to a stop, an actual revolution of the engine has become smaller, and a fuel injection amount has reached a limitation amount due to fuel injection amount adjustment in accordance with a boost pressure by a boost compensator, then engine stall avoid control that involves at least one of, or a combination of a plurality of, terminating fuel injection amount adjustment in accordance with the boost pressure by the boost compensator, changing a fuel injection amount adjustment map so as to result in an increase in the fuel injection amount in accordance with the boost pressure by the boost compensator, and changing a filtering process constant with the aim of increasing the control response speed.

3. The crash astern fuel injection control method of a marine engine with reduction and reversal device according to claim 1, wherein injection pressure increase control for increasing a fuel injection pressure is performed in addition to engine stall avoid control.

4. The crash astern fuel injection control method of a marine engine with reduction and reversal device according to claim 3, wherein injection timing lag control for delaying a fuel injection timing is performed in addition to injection pressure increase control.

5. The crash astern fuel injection control method of a marine engine with reduction and reversal device according to claim 1, wherein when it has been determined that the crash astern has been terminated the control during determination that a crash astern is being executed is cancelled so to return to the normal control in effect prior to execution of the crash astern.

6. The crash astern fuel injection control method of a marine engine with reduction and reversal device according to claim 2, wherein injection pressure increase control for increasing a fuel injection pressure is performed in addition to engine stall avoid control.

7. The crash astern fuel injection control method of a marine engine with reduction and reversal device according to claim 6, wherein injection timing lag control for delaying a fuel injection timing is performed in addition to injection pressure increase control.

8. The crash astern fuel injection control method of a marine engine with reduction and reversal device according to claim 2, wherein when it has been determined that the crash astern has been terminated, the control during determination that a crash astern is being executed is cancelled so to return to the normal control in effect prior to execution of the crash astern.

9. The crash astern fuel injection control method of a marine engine with reduction and reversal device according to claim 3, wherein when it has been determined that the crash astern has been terminated the control during determination that a crash astern is being executed is cancelled so to return to the normal control in effect prior to execution of the crash astern.

10. The crash astern fuel injection control method of a marine engine with reduction and reversal device according to claim 4, wherein when it has been determined that the crash astern has been terminated the control during determination that a crash astern is being executed is cancelled so to return to the normal control in effect prior to execution of the crash astern.

11. The crash astern fuel injection control method of a marine engine with reduction and reversal device according to claim 6, wherein when it has been determined that the crash astern has been terminated, the control during determination that a crash astern is being executed is cancelled so to return to the normal control in effect prior to execution of the crash astern.

12. The crash astern fuel injection control method of a marine engine with reduction and reversal device according to claim 7, wherein when it has been determined that the crash astern has been terminated, the control during determination that a crash astern is being executed is cancelled so to return to the normal control in effect prior to execution of the crash astern.

* * * * *